United States Patent
Yokoyama et al.

(10) Patent No.: US 11,157,059 B2
(45) Date of Patent: Oct. 26, 2021

(54) RADIATION IMAGING APPARATUS, RADIATION IMAGING SYSTEM, CONTROL METHOD FOR RADIATION IMAGING APPARATUS, AND NON-TRANSITORY COMPUTER- READABLE STORAGE MEDIUM

(71) Applicant: CANON KABUSHIKI KAISHA, Tokyo (JP)

(72) Inventors: Keigo Yokoyama, Kawasaki (JP); Minoru Watanabe, Yokohama (JP); Kentaro Fujiyoshi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 192 days.

(21) Appl. No.: 16/443,208

(22) Filed: Jun. 17, 2019

(65) Prior Publication Data
US 2019/0391629 A1    Dec. 26, 2019

(30) Foreign Application Priority Data

Jun. 22, 2018 (JP) .............................. JP2018-119211

(51) Int. Cl.
*G01T 1/175* (2006.01)
*G06F 1/3206* (2019.01)

(52) U.S. Cl.
CPC ............ *G06F 1/3206* (2013.01); *G01T 1/175* (2013.01)

(58) Field of Classification Search
CPC ............................. G06F 1/3206; G01T 1/175
See application file for complete search history.

(56) References Cited

U.S. PATENT DOCUMENTS

| | | | |
|---|---|---|---|
| 7,381,965 B2 | 6/2008 | Ishii et al. |
| 7,435,968 B2 | 10/2008 | Watanabe et al. |
| 7,488,948 B2 | 2/2009 | Ishii et al. |
| 7,535,506 B2 | 5/2009 | Nomura et al. |
| 7,541,617 B2 | 6/2009 | Mochizuki et al. |
| 7,557,355 B2 | 7/2009 | Mochizuki et al. |
| 7,629,564 B2 | 12/2009 | Mochizuki et al. |
| 7,642,517 B2 | 1/2010 | Ishii et al. |
| 7,645,976 B2 | 1/2010 | Watanabe et al. |

(Continued)

FOREIGN PATENT DOCUMENTS

| | | |
|---|---|---|
| JP | 2013-138829 | 7/2013 |
| JP | 2016-025416 | 2/2016 |

*Primary Examiner* — Gary Collins
(74) *Attorney, Agent, or Firm* — Venable LLP

(57) ABSTRACT

A radiation imaging apparatus comprising an imaging unit configured to generate a radiation image, a detector configured to detect radiation to monitor an incident dose, a processor including an amplifier and configured to perform processing of reading out signals from the imaging unit and the detector and outputting a signal based on the readout signals, and a controller configured to control the processor is provided. The controller causes the processor to operate in a first power consumption mode before radiation irradiation and perform a reset operation, and causes the processor to operate in a second power consumption mode with higher power consumption than the first power consumption mode in accordance with information indicating a start of radiation irradiation, and causes the processor to start outputting a signal for monitoring an incident dose based on a signal read out from the detector.

19 Claims, 12 Drawing Sheets

(56) References Cited

U.S. PATENT DOCUMENTS

| | | |
|---|---|---|
| 7,750,422 B2 | 7/2010 | Watanabe et al. |
| 7,812,313 B2 | 10/2010 | Mochizuki et al. |
| 7,812,317 B2 | 10/2010 | Watanabe et al. |
| 7,858,947 B2 | 12/2010 | Mochizuki et al. |
| 7,897,930 B2 | 3/2011 | Mochizuki et al. |
| 7,923,695 B2 | 4/2011 | Ishii et al. |
| 7,932,946 B2 | 4/2011 | Ishii et al. |
| 8,067,743 B2 | 11/2011 | Ishii et al. |
| 8,048,745 B2 | 12/2011 | Mochizuki et al. |
| 8,154,641 B2 | 4/2012 | Nomura et al. |
| 8,368,027 B2 | 2/2013 | Ishii et al. |
| 8,519,344 B2 | 8/2013 | Ishii et al. |
| 8,680,472 B2 | 3/2014 | Mochizuki et al. |
| 8,878,972 B2 | 11/2014 | Wayama et al. |
| 9,270,903 B2 | 2/2016 | Wayama et al. |
| 9,277,896 B2 | 3/2016 | Ofuji et al. |
| 9,423,513 B2 | 8/2016 | Watanabe et al. |
| 9,521,347 B2 | 12/2016 | Kawanabe et al. |
| 9,625,585 B1 | 4/2017 | Yokoyama et al. |
| 9,655,586 B2 | 5/2017 | Yagi et al. |
| 9,661,240 B2 | 5/2017 | Fujiyoshi et al. |
| 9,675,307 B2 | 6/2017 | Ofuji et al. |
| 9,726,767 B2 | 8/2017 | Kawanabe et al. |
| 9,835,732 B2 | 12/2017 | Fujiyoshi et al. |
| 9,838,638 B2 | 12/2017 | Furumoto et al. |
| 9,948,871 B2 | 4/2018 | Wayama et al. |
| 9,977,135 B2 | 5/2018 | Yokoyama et al. |
| 10,068,943 B2 | 9/2018 | Fujiyoshi et al. |
| 2012/0140892 A1* | 6/2012 | Kondou ............... G01T 1/17 378/98.8 |
| 2012/0189098 A1* | 7/2012 | Liu ............... A61B 6/4405 378/62 |
| 2013/0038738 A1* | 2/2013 | Ando ............... A61B 6/587 348/162 |
| 2013/0148784 A1 | 6/2013 | Tajima |
| 2013/0342514 A1 | 12/2013 | Yokoyama et al. |
| 2014/0151769 A1 | 6/2014 | Wayama et al. |
| 2014/0154833 A1 | 6/2014 | Wayama et al. |
| 2018/0008215 A1 | 1/2018 | Wayama et al. |
| 2018/0055464 A1 | 3/2018 | Watanabe et al. |
| 2018/0231672 A1 | 8/2018 | Yokoyama et al. |
| 2018/0321397 A1 | 11/2018 | Kawanabe et al. |
| 2019/0146103 A1 | 5/2019 | Ofuji et al. |

* cited by examiner

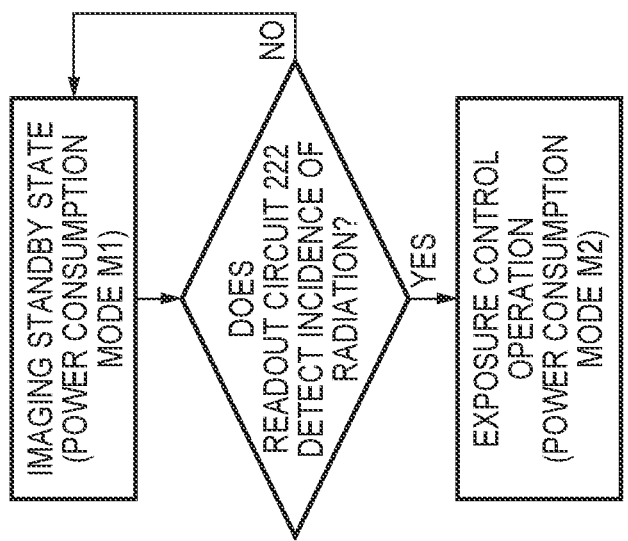
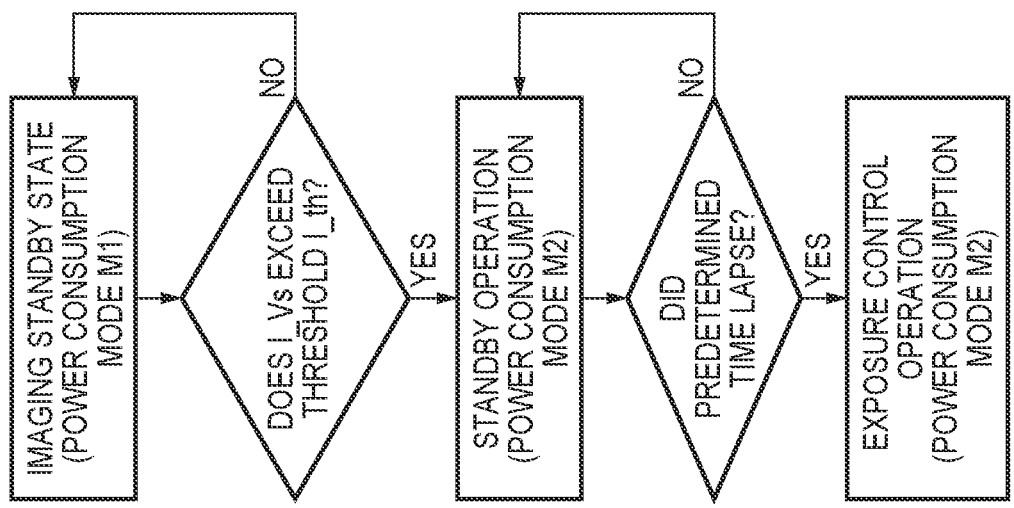
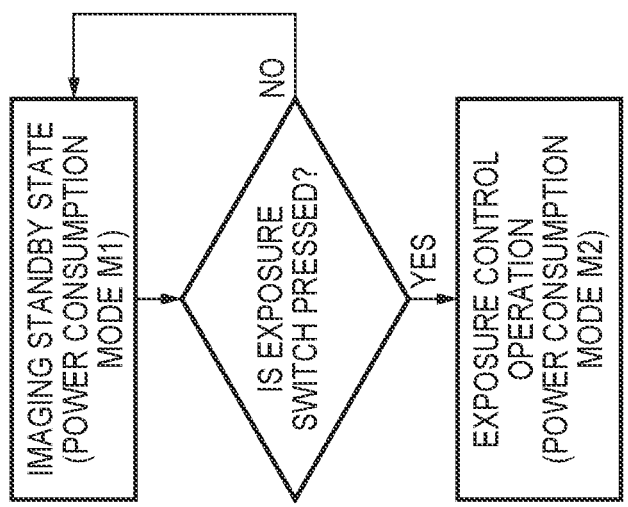

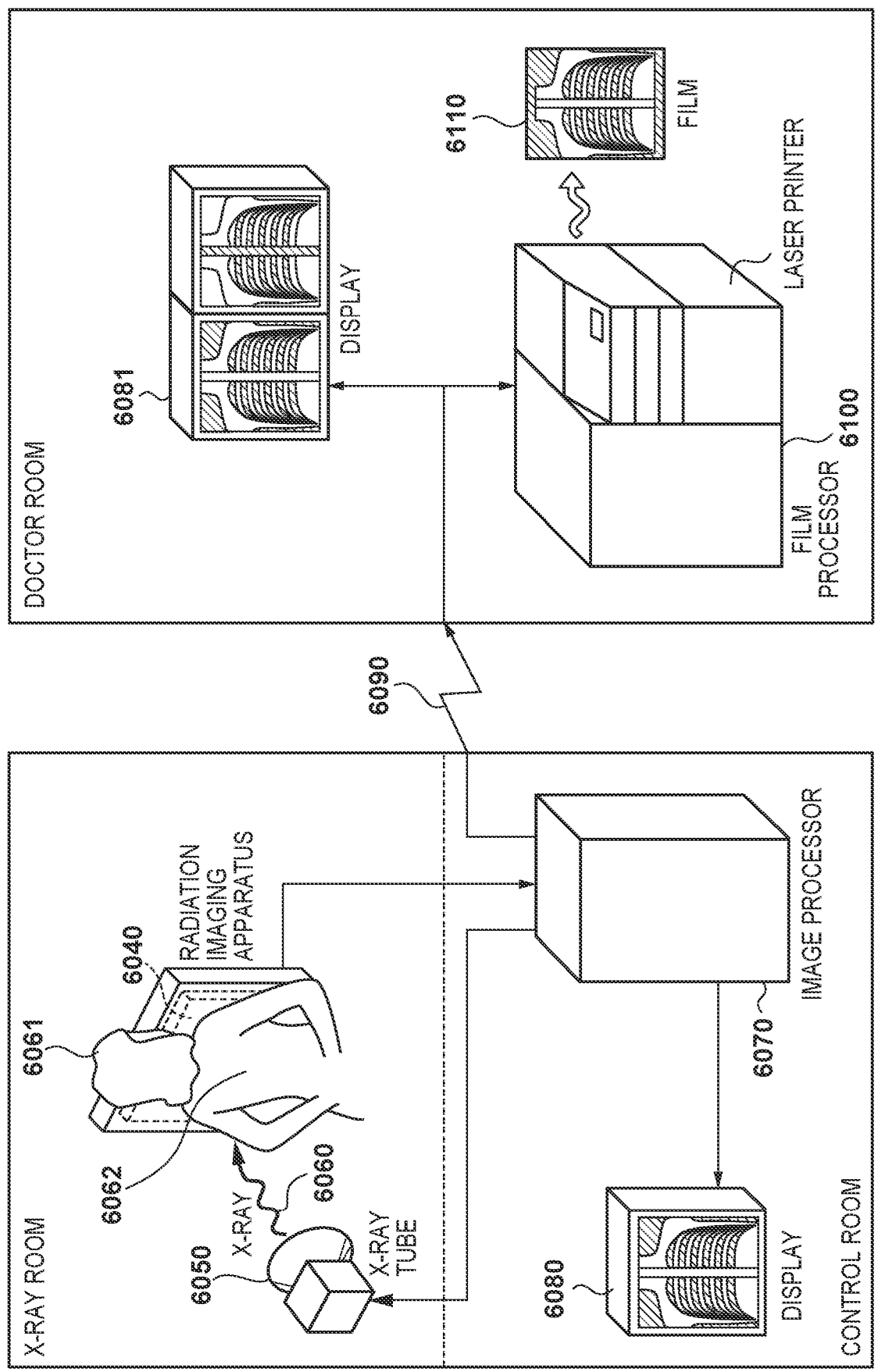

RADIATION IMAGING APPARATUS, RADIATION IMAGING SYSTEM, CONTROL METHOD FOR RADIATION IMAGING APPARATUS, AND NON-TRANSITORY COMPUTER- READABLE STORAGE MEDIUM

BACKGROUND OF THE INVENTION

Field of the Invention

The present invention relates to a radiation imaging apparatus, a radiation imaging system, a control method for the radiation imaging apparatus, and a non-transitory computer-readable storage medium.

Description of the Related Art

A radiation imaging apparatus has been widely used, which includes a pixel array having a two-dimensional array of pixels, each as a combination of a conversion element for converting radiation into an electrical signal and a switch element such as a TFT (Thin-Film Transistor). It is known that such a radiation imaging apparatus monitors the incident dose of radiation entering the apparatus to perform exposure control during radiation irradiation. Japanese Patent Laid-Open No. 2013-138829 discloses a radiation imaging apparatus that performs the reset operation of resetting image acquisition pixels at predetermined intervals in accordance with an imaging preparation instruction and also starts the operation of reading out a signal from a dose detection unit that monitors an incident dose and detecting the start of radiation irradiation.

SUMMARY OF THE INVENTION

In imaging for a radiation image, it sometimes takes several seconds to several ten minutes to actually perform imaging since the start of a reset operation following an imaging preparation instruction. Prolonging the time from the issuance of an imaging preparation instruction until the start of actual imaging may lead to high power consumption by an operation for detecting the start of radiation irradiation.

Some embodiments of the present invention provide a technique advantageous in suppressing the power consumption of a radiation imaging apparatus that performs exposure control.

According to some embodiments, a radiation imaging apparatus comprising: an imaging unit including a plurality of pixels configured to generate a radiation image; a detection unit configured to detect radiation to monitor an incident dose of radiation entering the imaging unit; a processing unit including an amplification unit configured to amplify signals output from the imaging unit and the detection unit, the processing unit being configured to perform processing of reading out signals from the imaging unit and the detection unit and outputting a signal based on the readout and amplified signals; and wherein the control unit causes the processing unit to operate in a first power consumption mode before radiation irradiation and perform a reset operation of resetting the plurality of pixels in the first power consumption mode, and causes the processing unit to operate in a second power consumption mode with higher power consumption than in the first power consumption mode in accordance with start information indicating a start of irradiation of the imaging unit with radiation, and causes the processing unit to start outputting a signal for monitoring an incident dose of radiation based on a signal read out from the detection unit in the second power consumption mode, is provided.

According to some other embodiment, a control method for a radiation imaging apparatus including an imaging unit including a plurality of pixels configured to generate a radiation image, a detection unit configured to detect radiation to monitor an incident dose of radiation entering the imaging unit, a processing unit including an amplification unit configured to amplify signals output from the imaging unit and the detection unit, and the processing unit being configured to perform processing of reading out signals from the imaging unit and the detection unit and outputting a signal based on the readout and amplified signals, the method comprising: causing the processing unit to operate in a first power consumption mode before radiation irradiation and perform a reset operation of resetting the plurality of pixels in the first power consumption mode; and causing the processing unit to operate in a second power consumption mode with higher power consumption than in the first power consumption mode in accordance with start information indicating a start of irradiation of the imaging unit with radiation, and causing the processing unit to start outputting a signal for monitoring an incident dose of radiation based on a signal read out from the detection unit in the second power consumption mode, is provided.

According to still other embodiments, a non-transitory computer-readable storage medium storing a program for causing a computer to execute a control method of a radiation imaging apparatus including an imaging unit including a plurality of pixels configured to generate a radiation image, a detection unit configured to detect radiation to monitor an incident dose of radiation entering the imaging unit, a processing unit including an amplification unit configured to amplify signals output from the imaging unit and the detection unit, and the processing unit being configured to perform processing of reading out signals from the imaging unit and the detection unit and outputting a signal based on the readout and amplified signals, the method comprising: causing the processing unit to operate in a first power consumption mode before radiation irradiation and perform a reset operation of resetting the plurality of pixels in the first power consumption mode; and causing the processing unit to operate in a second power consumption mode with higher power consumption than in the first power consumption mode in accordance with start information indicating a start of irradiation of the imaging unit with radiation, and causing the processing unit to start outputting a signal for monitoring an incident dose of radiation based on a signal read out from the detection unit in the second power consumption mode, is provided.

Further features of the present invention will become apparent from the following description of exemplary embodiments with reference to the attached drawings.

BRIEF DESCRIPTION OF THE DRAWINGS

FIGS. 11A to 11C are flowcharts for explaining operation examples of the radiation imaging apparatuses in FIGS. 2, 6, and 9; and FIG. 12 is a view showing an example of the arrangement of a radiation imaging system using the radiation imaging apparatuses in FIGS. 2, 6, and 9.

DESCRIPTION OF THE EMBODIMENTS

Figure 1:
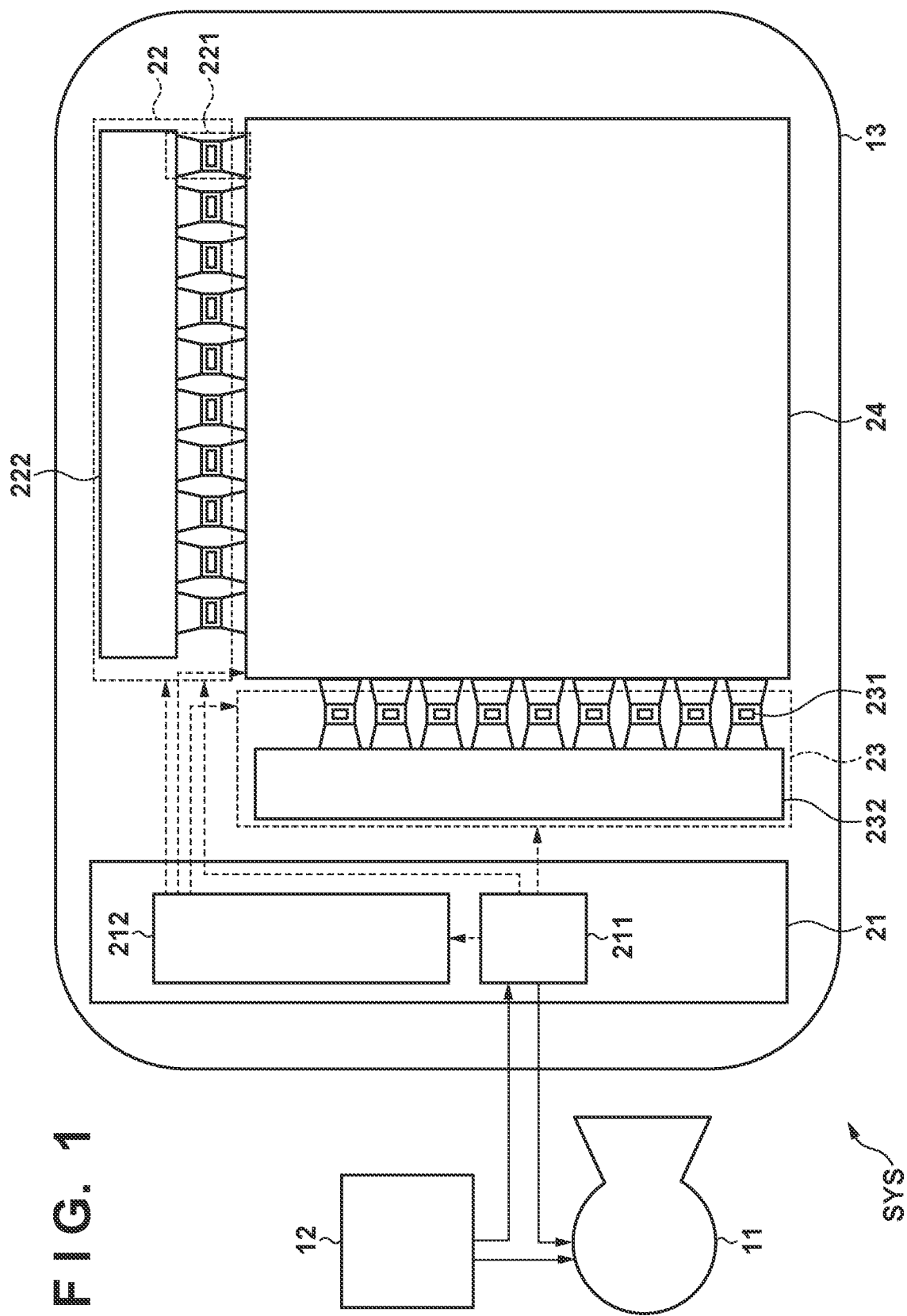
FIG. 1 is a block diagram showing an example of the arrangement of a radiation imaging system using a radiation imaging apparatus according to an embodiment of the present invention.

Concrete embodiments of a radiation imaging apparatus according to the present invention will be described with reference to the accompanying drawings. Note that in the following description and drawings, common reference numerals denote common components throughout a plurality of drawings. Accordingly, the common components will be described by cross-referring to a plurality of drawings, and a description of components denoted by common reference numerals will appropriately be omitted. Note that radiation according to the present invention can include not only α-rays, β-rays, and γ-rays that are beams generated by particles (including photons) emitted by radioactive decay but also beams having energy equal to or higher than the energy of these beams, for example, X-rays, particle rays, and cosmic rays.

The arrangement and operation of radiation imaging apparatus 13 according to an embodiment of the present invention will be described with reference to FIGS. 1 to 5B and 11A. FIG. 1 is a block diagram showing an example of the arrangement of a radiation imaging system SYS using the radiation imaging apparatus 13 according to the first embodiment of the present invention. The radiation imaging system SYS includes a radiation irradiation unit 11 including a radiation source, a control console 12 that performs operations and settings when a user (for example, a doctor or radiation technician) uses the radiation imaging system SYS, and the radiation imaging apparatus 13.

The radiation imaging apparatus 13 is configured to obtain a radiation image formed by radiation. A radiation image can be formed by radiation emitted from the radiation source included in the radiation irradiation unit 11 and transmitted through an object. The radiation imaging apparatus 13 includes a control unit 21, a readout unit 22, a drive unit 23, and an imaging unit 24. The radiation imaging apparatus 13 is connected to the radiation irradiation unit 11 and the control console 12 outside the radiation imaging apparatus 13 by using an appropriate communication method such as a wired or wireless communication method. A radiation exposure switch operated by the user to issue an instruction to start radiation irradiation is connected to the control console 12. The radiation exposure switch is, for example, a two-stage switch. When the radiation exposure switch is pressed to the first stage, the radiation source included in the radiation irradiation unit 11 starts a warm-up operation. When the radiation exposure switch is pressed to the second stage, the radiation source of the radiation irradiation unit 11 emits radiation upon fulfillment of predetermined conditions.

In this embodiment, the control unit 21 includes the signal control unit 211, and the power supply unit 212 and controls the operation of the radiation imaging apparatus 13. More specifically, the control unit 21 controls the operations of the drive unit 23 and the readout unit 22 to read out signals from the imaging unit 24, and causes the drive unit 23 and the readout unit 22 to function as processing units that perform the processing of outputting signals based the readout signals. That is, the drive unit 23 drives the pixels arranged in the imaging unit 24 under the control of the control unit 21 to read out signals generated by pixels to the readout unit 22. The readout unit 22 performs the processing of outputting readout signals to generate signals used to monitor the incident dose of radiation entering the imaging unit 24 for AEC (Auto Exposure Control) and generate a radiation image. For this reason, in this specification, the drive unit 23 and the readout unit 22 are sometimes written as "processing units". In other words, the "processing units" in the specification include the drive unit 23 and the readout unit 22. The control unit 21 of the radiation imaging apparatus 13 can perform control based on signals, information, and the like input from the radiation irradiation unit 11 and the control console 12 to the radiation imaging apparatus 13. The control unit 21 of the radiation imaging apparatus 13 may also execute control based on signals, information, and the like generated by the imaging unit 24 and the like in the radiation imaging apparatus 13. Although this embodiment will exemplify exposure control performed by monitoring the incident dose of radiation entering the imaging unit 24, this is not exhaustive. For example, the dose of radiation obtained by monitoring the incident dose of radiation entering the imaging unit 24 may be used to estimate the dose of radiation entering the object.

A signal control unit 211 supplies control signals to the power supply unit 212, the readout unit 22, and the drive unit 23 based on the signals input from the radiation irradiation unit 11 and the control console 12 or the signals generated inside the radiation imaging apparatus 13. Upon receiving power from an external power supply or a battery (not shown) installed in the radiation imaging apparatus 13, the power supply unit 212 converts the power into usable voltages or the like by using a DCDC converter, a regulator, and the like and supplies the voltages to the control unit 21, the readout unit 22, the drive unit 23, the imaging unit 24, and the like. A power supply unit 212 controls whether to supply power to the readout unit 22, the drive unit 23, and the imaging unit 24 and the amounts of power to be supplied in accordance with signals from the signal control unit 211. That is, the control unit 21 controls the power supplied to processing units including the drive unit 23 and the readout unit 22 and the imaging unit 24. In this embodiment, the power supply unit 212 is included in the control unit 21. However, this is not exhaustive, and the power supply unit 212 may be configured independently of the control unit 21. In this case as well, the control unit 21 controls the power supplied to processing units and the imaging unit 24 by controlling the power supply unit 212 configured independently of the control unit 21.

The readout unit 22 includes a readout IC 221 and a readout circuit 222. The readout unit 22 converts an analog signal output from each of the plurality of pixels arranged in the imaging unit 24 into a digital signal. In addition, the readout unit 22 may process each converted digital signal into radiation image information or a form that can be used as a signal for exposure control. The operations of the readout IC 221 and the readout circuit 222 can be controlled based on the signal input from the signal control unit 211 to the readout unit 22. In addition, the readout circuit 222 may control the operation of the readout IC 221 based on the signals input from the signal control unit 211 to the readout circuit 222 of the readout unit 22. The power consumed by the readout IC 221 and the readout circuit 222 can be changed by changing supply power from the power supply unit 212 of the control unit 21 and changing the operation cycle or consumption current based on a signal from the signal control unit 211.

The drive unit 23 includes drive ICs 231 and a drive circuit 232. The drive unit 23 supplies drive voltages Vg1 to Vgm to the imaging unit 24 based on signals or information input from the signal control unit 211. The power supply unit 212 supplies power P_Vg necessary to supply the drive voltages Vg1 to Vgm to the drive unit 23. The power P_Vg can be changed by changing the voltage applied from the power supply unit 212. In addition, the power P_Vg can be changed by changing the power consumed in the imaging unit 24 by changing the drive cycle of each pixel in the imaging unit 24.

Figure 2:
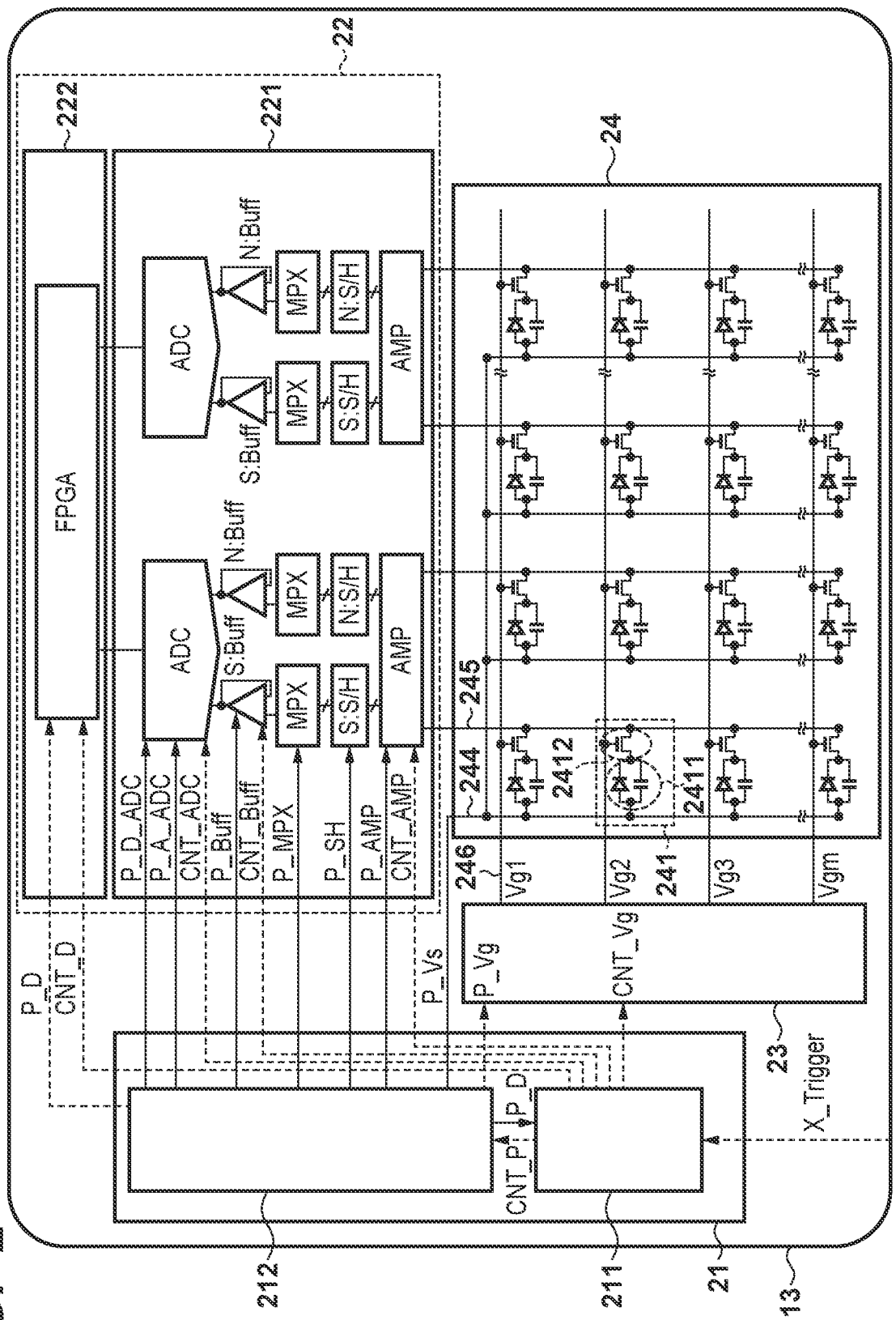
FIG. 2 is an equivalent circuit diagram showing an example of the arrangement of the radiation imaging apparatus according to the embodiment of the present invention.

As shown in FIG. 2, the imaging unit 24 includes a plurality of pixels. The imaging unit 24 receives power P_Vs supplied from the power supply unit 212 as well as receiving the power P_Vg via the drive unit 23. A signal from each pixel in the imaging unit 24 is output to the readout unit 22.

FIG. 2 is an equivalent circuit diagram showing an example of the arrangement of the radiation imaging apparatus 13 according to this embodiment. In the embodiment, the imaging unit 24 includes a pixel array of a plurality of pixels 241 arranged in a matrix pattern and configured to generate radiation images. Each pixel 241 outputs a signal (electrical signal) corresponding to radiation entering the pixel 241. Each pixel 241 includes a conversion pixel 2411 for converting radiation or light converted from radiation into electric charge and a switch element 2412 for outputting a signal corresponding to the generated electric charge to a signal line 245. FIG. 2 shows the four pixels 241 in the row direction and the four pixels 241 in the column direction. In practice, however, many pixels 241 are arranged to form more rows and columns. For example, the radiation imaging apparatus 13 including the imaging unit 24 with a size of 35 cm×43 cm can include pixels 241 of about 2,800 rows× about 3,400 columns.

In this embodiment, each conversion pixel 2411 includes a scintillator for converting radiation into light and a photoelectric conversion element for converting the light into electric charge. However, this is not exhaustive. As the conversion pixel 2411, a direct conversion element configured to directly convert radiation into electric charge may be used.

As the switch element 2412, for example, a TFT (Thin-Film Transistor) formed on amorphous silicon or polysilicon or a TFT formed on crystal silicon may be used. However, this is not exhaustive. As the switch element 2412, a switch element using another type of semiconductor material or the like may be used.

In each pixel 241, the first main electrode of the switch element 2412 is electrically connected to the first electrode of the conversion pixel 2411, and a bias line 244 common to the respective pixels 241 is electrically connected to the second electrode of the conversion pixel 2411. The power P_Vs from the power supply unit 212 is supplied to the bias line 244 that supplies a bias voltage Vs to the pixel 241.

The second main electrodes of the switch elements 2412 of the plurality of pixels 241 arranged along the column direction are commonly connected to each signal line 245. The signal line 245 is arranged for each column along which the plurality of pixels 241 are arranged and is electrically connected to the readout IC 221.

Each drive line 246 is commonly connected to the control terminals of the switch elements 2412 of the plurality of pixels 241 arranged along the row direction. Gate control voltages Vg1 to Vgn are applied from the drive ICs 231 to the drive line 246. Subsequently, a control voltage at which the connected switch element 2412 is rendered conductive will be referred to as an HI voltage, and a voltage at which the switch element 2412 is rendered nonconductive will be referred to as an LO voltage. When the HI voltage is applied to the drive line 246, each connected switch element 2412 is rendered conductive. On the row on which the HI voltage is applied to the drive line 246, signals corresponding to the electric charge accumulated in the conversion pixels 2411 are output to the respective signal lines 245.

Figure 3:
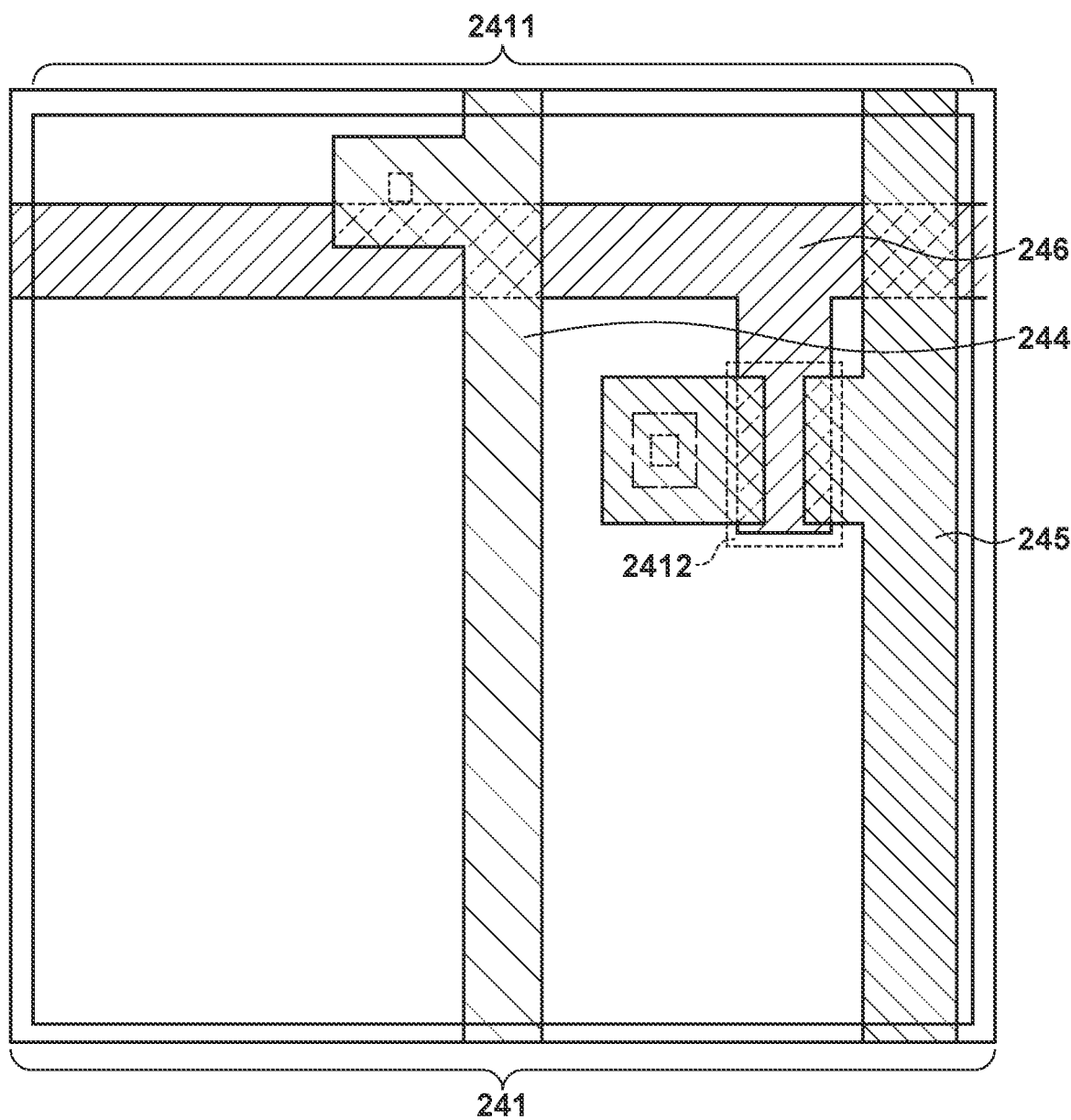
FIG. 3 is a plan view showing an example of the structure of a pixel of the radiation imaging apparatus in FIG. 2.

The structure of each pixel 241 will be described next. FIG. 3 is a plan view showing the structure of the pixel 241. As described above, the pixel 241 includes the conversion pixel 2411 and the switch element 2412.

In this embodiment, as the conversion pixel 2411, a PIN photodiode is used. However, this is not exhaustive. For example, as the conversion pixel 2411, a PN or MIS photodiode may be used. The conversion pixel 2411 can be stacked on the switch element 2412 provided on an insulating support substrate such as a glass substrate so as to be sandwiched between a dielectric interlayer and an organic planarizing film.

Each conversion pixel 2411 is separated from the adjacent pixel 241 so as to inhibit electrical conduction between their first electrode sides. As the conversion pixel 2411, the n-layer, i-layer, and p-layer of a PIN photodiode are stacked in that order from the first electrode side to which the first main electrode of the switch element 2412 is electrically connected to the second electrode to which the bias line 244 is connected. The bias line 244 is provided on the second electrode of the conversion pixel 2411 through a protective film or the like, and electrical conduction is established between the conversion pixel 2411 and the bias line 244 through a conductive via embedded in a contact hole provided in the protective film. A protective film, a planarizing film, a scintillator, and the like are provided on the bias line 244.

Figure 4:
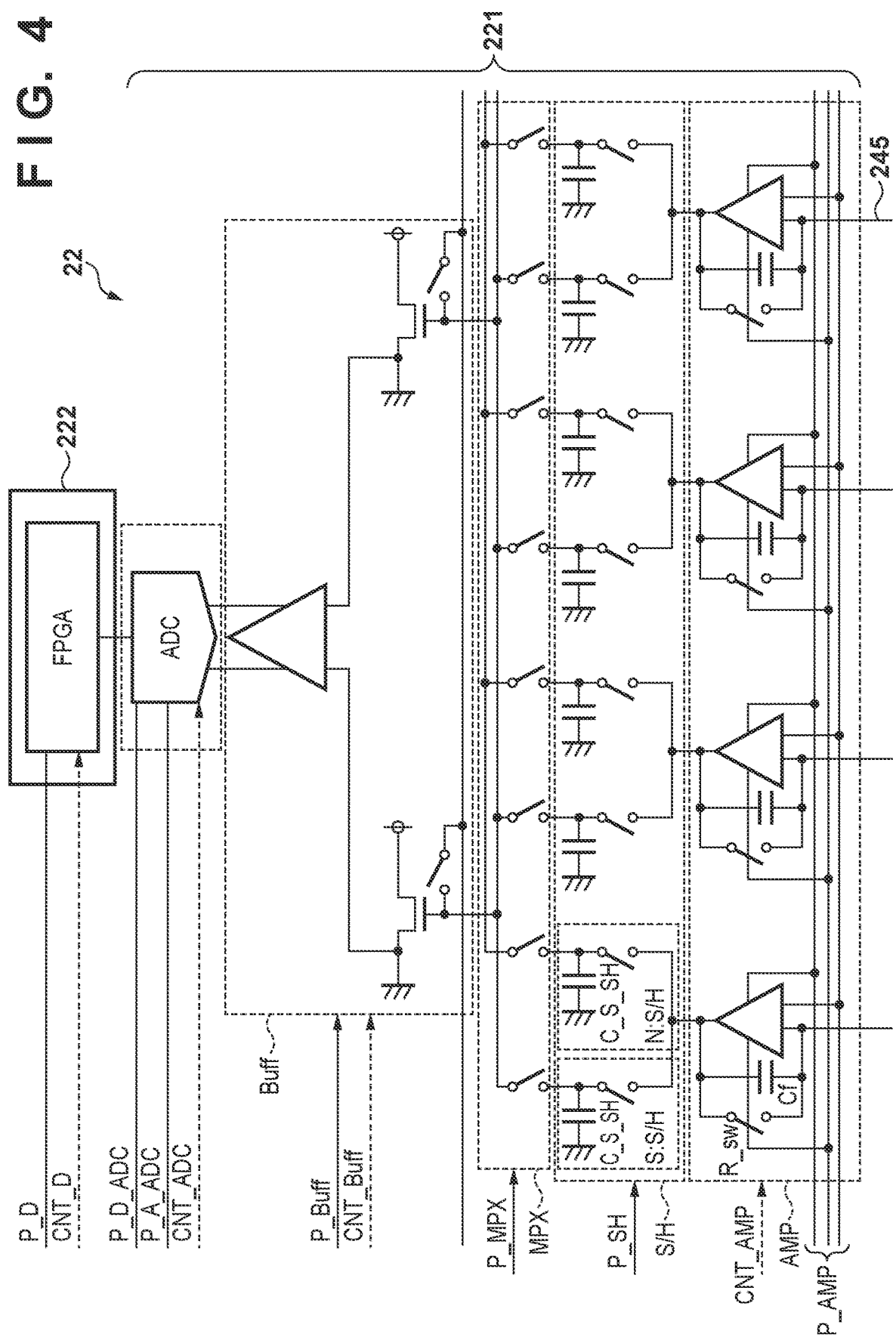
FIG. 4 is an equivalent circuit diagram showing an example of the arrangement of the readout unit of the radiation imaging apparatus in FIG. 2.

The readout unit 22 according to this embodiment will be described next with reference to FIG. 4. As described above, the readout unit 22 includes the readout IC 221 and the readout circuit 222.

Each signal line 245 is connected to the readout IC 221. In the readout IC 221, a charge amplifier AMP as an amplification unit that amplifies a signal output from the pixel 241 is connected to the first stage of each signal line 245. The charge amplifier AMP receives power P_AMP supplied from the power supply unit 212 to operate each constituent element in the charge amplifier AMP. The charge amplifier AMP can charge a feedback (storage) capacitor Cf connected to the signal line 245 and the charge amplifier AMP to a reference voltage by temporarily short-circuiting between the inverting input terminal and output terminal of an operational amplifier using a switch R_sw. In other words, the charge amplifier AMP is configured to supply the reference potential supplied to the charge amplifier AMP to the signal line 245 connecting the imaging unit 24 to the charge amplifier AMP.

The output stage of the charge amplifier AMP is connected to a sample/hold circuit S/H. The sample/hold circuit S/H includes a signal sample/hold circuit S:S/H and a noise sample/hold circuit N:S/H. The output stage of the charge amplifier AMP can be selectively connected to both the signal sample/hold circuit S:S/H and the noise sample/hold circuit N:S/H, and hence configured to perform correlation double sampling. The sample/hold circuit S/H receives power P_SH supplied from the power supply unit 212.

The output stages of the signal sample/hold circuit S:S/H and the noise sample/hold circuit N:S/H of the sample/hold circuit S/H are connected to a multiplexer MPX. The sample/hold circuit S/H corresponding to each signal line 245 is configured to be selectively connected to a buffer circuit Buff on the subsequent stage. Because of the intermediacy of the multiplexer MPX, the number of buffer circuits Buff is smaller than the number of channels of each charge amplifier AMP. This makes it possible to suppress power consumption and the mounting space in the readout IC 221. Each multiplexer MPX receives power P_MUX supplied from the power supply unit 212.

The buffer circuit Buff can give proper gains the voltages accumulated in the signal sample/hold circuit S:S/H and the noise sample/hold circuit N:S/H. The buffer circuit Buff receives power P_Buff supplied from the power supply unit 212.

An analog/digital converter ADC receives, via the buffer circuit Buff, the voltage signal based on the voltage accumulated in the signal sample/hold circuit S:S/H and the voltage signal based on the voltage accumulated in the noise sample/hold circuit N: S/H. The analog/digital converter ADC functions as a conversion unit that coverts a voltage analog signal into a digital signal (digital value) based on the difference between these two signals. The power supply unit 212 supplies, to the analog/digital converter ADC, analog circuit power P_A_ADC necessary to convert an analog signal into a digital signal and digital circuit power P_D_ADC necessary to process data obtained by digital conversion.

The readout circuit 222 including an FPGA (Field Programmable Gate Array) is connected to the output stage of the analog/digital converter ADC. The readout circuit 222 functions as an arithmetic unit that arithmetically processes the digital signal output from the analog/digital converter ADC. For example, the readout circuit 222 may perform digital signal rearrangement, fixed pattern noise correction, correction of an output from a defective pixel, gain correction, crosstalk correction, and the like. The power supply unit 212 supplies power P_D to the readout circuit 222.

Changing the voltage supplied from the power supply unit 212 makes it possible to change the power P_AMP, P_SH, P_MUX, P_BUFF, P_A_ADC, P_D_ADC, and P_D required for the respective constituent elements of the readout unit 22. In addition, changing the internal current consumption by using signals CNT_AMP, CNT_Buff, and CNT_ADC supplied from the signal control unit 211 can change the power necessary for the charge amplifier AMP, the buffer circuit Buff, and the analog/digital converter ADC. More specifically, the power consumption can be changed by changing the current flowing in the current mirror circuit used in the circuit by using the signals CNT_AMP, CNT_Buff, and CNT_ADC. When a current is suppressed, the power consumption can be improved, although the noise rate and the slew rate decrease. The power consumption can also be changed by changing the operating frequency using the signals CNT_ADC and CNT_D supplied from the signal control unit 211 in the analog/digital converter ADC and the readout circuit 222.

An example of the operation of the readout unit 22 will be described next. When a signal (analog signal) is input from the pixel 241 connected to an arbitrary signal line 245, the feedback capacitor of the charge amplifier AMP is charged with electric charge corresponding to a signal from the pixel 241. Rendering the signal sample/hold circuit S: S/H conductive to the output terminal of the charge amplifier AMP will charge the signal sample/hold circuit S:S/H with voltage information corresponding to electric charge originating from the signal from the pixel 241. On the other hand, the noise sample/hold circuit N:S/H is charged in advance with the voltage information of the output terminal of the charge amplifier AMP in a state before the signal from the pixel 241 is input. When the signal sample/hold circuit S:S/H and the noise sample/hold circuit N:S/H are charged, the switch R_sw is always rendered nonconductive. The signal sample/hold circuit S:S/H and the noise sample/hold circuit N:S/H are then connected to the buffer circuit Buff to input each piece of voltage information to the analog/digital converter ADC via the buffer circuit Buff. As described above, the analog/digital converter ADC converts an analog signal into a digital signal based on the difference between signals (voltage information) from the signal sample/hold circuit S:S/H and the noise sample/hold circuit N:S/H. The readout circuit 222 further performs various types of arithmetic processing described above with respect to the converted digital signal.

The operation of the radiation imaging apparatus 13 according to this embodiment will be described next with reference to the timing chart shown in FIG. 5A.

A period T1 in the timing chart is a period of imaging preparation before the start of radiation irradiation. When the user presses an imaging preparation instruction button of the control console 12, the period T1 starts. During the period T1, the user operates the control console 12 to perform setting of irradiation conditions such as the tube voltage and tube current of the radiation source included in the radiation irradiation unit 11, positioning of an object, and the like.

In the period T1, the control unit 21 causes the processing units including the drive unit 23 and the readout unit 22 to operate in a power consumption mode M1 (first power consumption mode). In the power consumption mode M1, the control unit 21 causes the power supply unit 212 to supply the power P_Vs and the power P_Vg to the bias line 244 and the drive unit 23 so as to respectively supply the bias voltage Vs and the drive voltages Vg1 to Vgm to the bias line 244 and the drive line 246. With this operation, the control unit 21 causes the processing units to perform the reset operation of resetting each of the plurality of pixels 241. More specifically, in order to periodically remove a dark current from the conversion pixel 2411, the drive unit 23 sequentially sets the drive voltages Vg1 to Vgm to the HI voltage. In this case, the charge amplifier AMP short-circuits the switch R_sw to supply the reference potential supplied to the charge amplifier AMP from the charge amplifier AMP to the signal line 245 under the control of the control unit 21. With this operation, the conversion pixel 2411 of the pixel 241 rendered conductive to the signal line 245 is reset to the reference potential supplied to the charge amplifier AMP. That is, the control unit 21 resets each of the plurality of pixels 241 arranged in the imaging unit 24 by supplying the reference potential from the charge amplifier AMP to each of the plurality of pixels 241 via the signal line 245.

In the period T1, the control unit 21 suppresses the power supplied from the power supply unit 212 to the readout unit 22 except for power supplied to the charge amplifier AMP. More specifically, when supplying the power P_SH, P_MPX, P_Buff, P_A_ADC, P_D_ADC, and P_D from the power supply unit 212, the control unit 21 suppresses the voltage supplied from the power supply unit 212. In this manner, the control unit 21 controls the processing units including the drive unit 23 and the readout unit 22 to operate, before the start of radiation irradiation, in the power consumption mode M1 in which the power consumption is suppressed.

Subsequently, when the user presses the radiation exposure switch connected to the control console 12 to the second stage, the radiation irradiation unit 11 starts radiation irradiation based on a signal from the control console 12. In addition, the control unit 21 receives start information X-Trigger indicating the start of radiation irradiation from the control console 12. In accordance with the start information X-Trigger, the control unit 21 transits from the period T1 to a period T2 to cause the processing units including the drive unit 23 and the readout unit 22 to operate in a power consumption mode M2 (second power consumption mode) with higher power consumption than the power consumption mode M1. More specifically, in accordance with the start information X-Trigger, the control unit 21 increases the amount of power by increasing the applied voltages for the power P_SH, P_MPX, P_Buff, P_A_ADC, P_D_ADC, and P_D to be supplied from the power supply unit 212. That is, the power supplied to the sample/hold circuit S/H, the buffer circuit Buff, the analog/digital converter ADC, and the readout circuit 222 in the power consumption mode M2 in the period T2 becomes higher than that in the power consumption mode M1 in the period T1. With this operation, the readout unit 22 makes the signal (analog signal) output from the pixel 241 of the imaging unit 24 ready to be converted into a digital signal. Referring to FIGS. 5A and 5B and FIGS. 8 and 10 (to be described later), LO indicates a state in which the power consumption of each power P before input of the start information X-Trigger is low, and HI indicates a state in which the power consumption of each power P after input of the start information X-Trigger is high.

In this embodiment, when the user presses the radiation exposure switch to the second stage, the start information X-Trigger is input to cause the control unit 21 to perform control so as to increase the power supplied from the power supply unit 212 to the readout unit 22. However, this is not exhaustive. For example, the time interval from the instant the user presses the radiation exposure switch to the first stage to the instant the user presses the radiation exposure switch to the second stage after the start of warm-up of the radiation source is shorter than the time interval from the instant the user presses the imaging preparation instruction button to the instant the user presses the radiation exposure switch to the second stage. Accordingly, the control unit 21 may increase the power supplied to the processing units including the readout unit 22 at the same time when the radiation source of the radiation irradiation unit 11 starts a warm-up operation at the timing when the user presses the radiation exposure switch to the first stage.

In this embodiment, in the period T2 during which radiation enters, driving the specific drive line 246 will use the pixel 241 connected to the driven drive line 246 as a detection unit for detecting radiation entering the imaging unit 24 for exposure control. The control unit 21 periodically detects a signal based on radiation entering the pixel 241 functioning as a detection unit. Referring to FIG. 5A, in the period T2, the control unit 21 causes the drive unit 23 to operate to periodically apply the HI voltage to the drive line 246 to which a drive voltage Vg2 is supplied, and uses, as a detection unit, the pixel 241 connected to the drive line 246 to which the drive voltage Vg2 is supplied. In the period T2, the readout unit 22 has received power necessary to output, as a digital signal, the signal generated by the pixel 241 functioning as a detection unit based on radiation as described above. With this operation, in the power consumption mode M2, the control unit 21 causes the processing units to start to output a signal for exposure control based on the signal read out from the pixel 241 functioning as a detection unit. In addition, in the period T2, the control unit 21 causes the drive unit 23 to operate so as to make the plurality of pixels 241 perform an accumulating operation for obtaining a radiation image.

This embodiment uses the pixel 241, of the plurality of pixels 241, which is connected to any proper one of the drive lines 246 as a detection unit for detecting radiation entering the imaging unit 24 for exposure control. However, this is not exhaustive. Any pixel may be used as a detection unit as long as it can generate a signal corresponding to radiation entering the imaging unit 24 and is connected to a circuit that can perform analog/digital conversion. For example, an arrangement equivalent to the pixel 241 or the conversion pixel 2411 may be provided as a detection unit at or near the imaging unit 24 separately from the plurality of pixels 241 for generating a radiation image and configured to input an output signal to the readout unit 22.

In the period T1 before radiation irradiation, the processing units operate in the power consumption mode M1 to suppress power consumption by suppressing the voltage supplied to the readout unit 22 of the processing units. In accordance with the start information X-Trigger indicating the start of radiation irradiation, the processing units operate in the power consumption mode M2, and power for exposure control during radiation irradiation is supplied to the readout unit 22 of the processing units. This makes it possible to suppress power consumption before radiation irradiation in the radiation imaging apparatus 13 for exposure control.

Figure 5A:
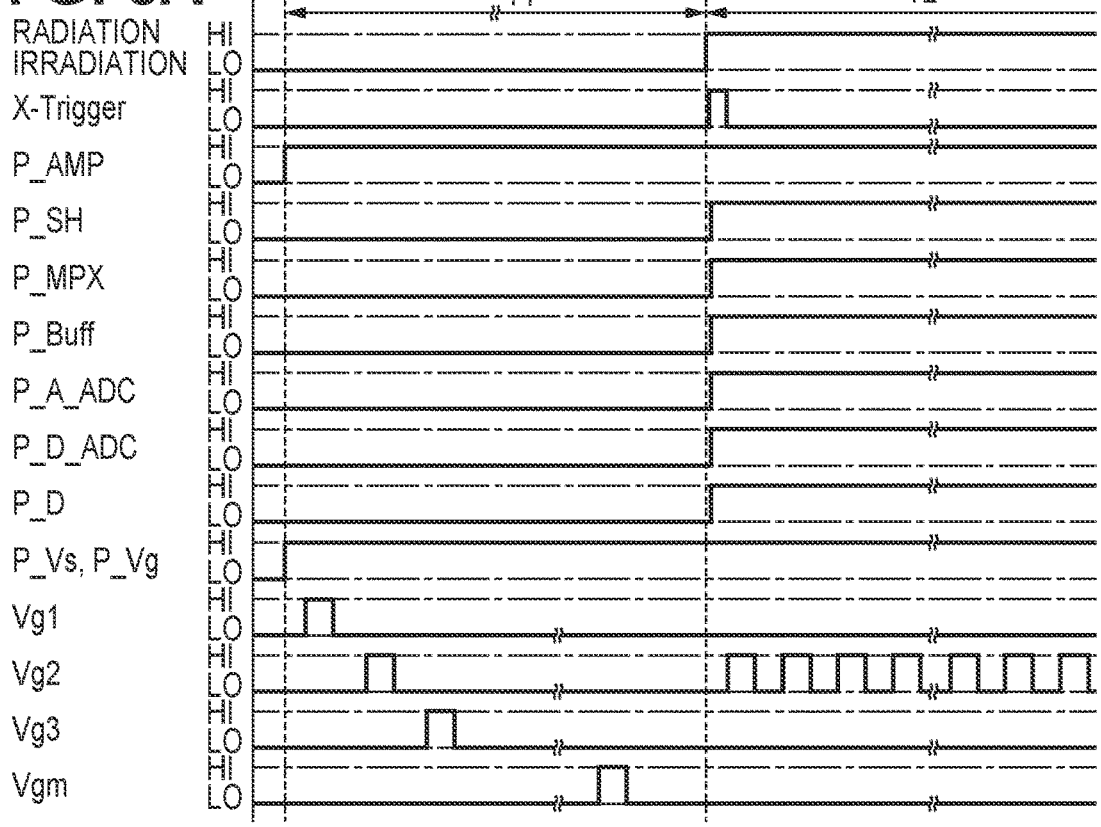
FIGS. 5A and 5B are timing charts for explaining operation examples of the radiation imaging apparatus in FIG. 2.
Figure 5B:
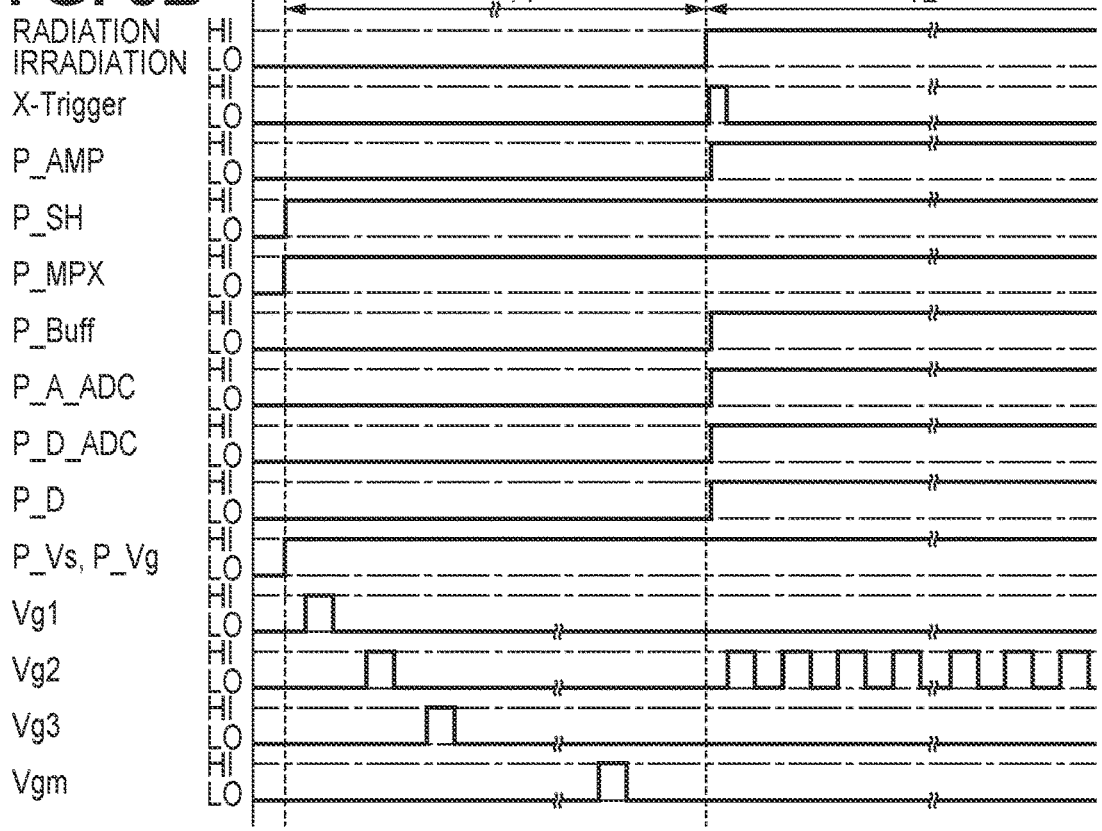

FIG. 5B shows the operation of the radiation imaging apparatus 13, which differs from the operation indicated by the timing chart of FIG. 5A, in a case in which power consumption is controlled by changing the amount of current supplied instead of a supplied voltage. More specifically, in the power consumption mode M1 in the period T1, the control unit 21 causes the power supply unit 212 to apply the same voltage as that in the power consumption mode in the period T2 to the readout unit 22. In the period T1, the control unit 21 suppresses the amount of current supplied to each of the charge amplifier AMP, the buffer circuit Buff, and the analog/digital converter ADC by using the signals CNT_AMP, CNT_Buff, and CNT_ADC output to the readout unit 22. This suppresses the P_AMP, P_BUFF, and P_A_ADC. The control unit 21 further causes the analog/digital converter ADC and the readout circuit 222 of the readout unit 22 to stop digital signal processing via the signals CNT_ADC and CNT_D. This can suppress the power P_D_ADC and P_D consumed. Like the operation shown in FIG. 5A, the control unit 21 causes the processing units including the drive unit 23 and the readout unit 22 to transit to the power consumption mode M2 in accordance with the start information X-Trigger indicating the start of radiation irradiation, and supplies power for exposure control to the processing units in the period T2.

In the operation shown in FIG. 5B, in the period T1 before radiation irradiation, the control unit 21 suppresses power consumption by suppressing the amount of current supplied to the readout unit 22. On the other hand, applying a necessary voltage to each constituent element of the readout unit 22 before radiation irradiation makes it possible to acquire, in the period T2, a signal for exposure control from the pixel 241 functioning as a detection unit while the potential supplied to each constituent element of the readout unit 22 is stable.

In the operation indicated by the timing chart of FIG. 5A, the control unit 21 reduces the power consumption of the radiation imaging apparatus 13 by suppressing a voltage supplied to the readout unit 22 until the acquisition of the start information X-Trigger for radiation irradiation. In the power consumption mode M2 after the start of radiation irradiation, the control unit 21 performs control to supply a voltage higher than that in the power consumption mode M1 to at least part of the readout unit 22, as described above. More specifically, in the power consumption mode M1, the control unit 21 causes the charge amplifier AMP of the readout unit 22 to operate for a reset operation, and reduces voltages supplied to other constituent elements of the readout unit 22, thereby suppressing power consumption. Subsequently, in the power consumption mode M2, the control unit 21 causes the sample/hold circuit S/H, the buffer circuit Buff, the analog/digital converter ADC, and the readout circuit 222 of the readout unit 22 in addition to the charge amplifier AMP to operate. This makes it possible to perform exposure control while suppressing power consumption until radiation irradiation.

According to the operation indicated by the timing chart of FIG. 5B, the control unit 21 reduces the power consumption of the radiation imaging apparatus until radiation irradiation by suppressing the amount of current supplied to the readout unit 22 until the acquisition of the start information X-Trigger concerning radiation irradiation. In the operation shown in FIG. 5B, the voltage supplied to each constituent element of the readout unit 22 may be reduced as in the operation shown in FIG. 5A. This makes it possible to also suppress power consumption in the period T1 before radiation irradiation.

The arrangement of the readout unit 22 is not limited to the above arrangement. The readout unit 22 is only required to be configured to output, as the digital signal, a signal output from the detection unit, and change power consumption under the control of the control unit 21 in order to perform exposure control during radiation irradiation.

FIG. 11A is a flowchart for briefly explaining this embodiment. When the radiation imaging apparatus 13 according to the embodiment is in the standby state before radiation irradiation, the control unit 21 controls the processing units including the drive unit 23 and the readout unit 22 to operate in the power consumption mode M1. At this time, the control unit 21 causes the processing units to perform a reset operation for removing (resetting) a dark current from each of the plurality of pixels 241 in the imaging unit 24. When the user presses the radiation exposure switch of the control console 12 to the second stage, the control unit 21 controls the processing units to operate in the power consumption mode M2 with higher power consumption than in the power consumption mode M1. Upon transiting to the power consumption mode M2, the control unit 21 causes the processing units to start an operation for acquiring a signal for exposure control by using some of the pixels 241 arranged in the imaging unit 24 as detection units. At the same time, the control unit 21 controls the drive unit 23 to perform an accumulating operation for accumulating electric charge for the generation of a radiation image in each pixel 241 that is not used as a detection unit. The control unit 21 switches the power consumption modes before and after radiation irradiation. This makes it possible to suppress the amount of power consumed before radiation irradiation in the radiation imaging apparatus 13 that performs exposure control.

In this embodiment, the control unit 21 performs exposure control for the radiation source of the radiation irradiation unit 11 in accordance with a signal for monitoring the incident dose of radiation output from the processing units. More specifically, the control unit 21 determines, based on a signal acquired by monitoring the incident dose of radiation, that a preset incident dose of radiation is achieved. Upon determining that the preset incident dose of radiation is achieved, the control unit 21 transmits a signal for stopping radiation irradiation to the radiation irradiation unit 11. The radiation irradiation unit 11 causes the radiation source to stop radiation irradiation in accordance with this signal. The control console 12 may determine the incident dose of radiation, instead of the control unit 21, based on the signal output from the readout unit 22. After imaging for a radiation image is performed by using exposure control, each pixel 241 outputs a signal for the generation of a radiation image. More specifically, after the end of irradiation of the imaging unit 24 with radiation, the control unit 21 causes the processing units including the drive unit 23 and the readout unit 22 to operate in a power consumption mode M3 (third power consumption mode) with higher power consumption than the power consumption mode M1 in the period T1. In the power consumption mode M3, the control unit 21 causes the drive unit 23 to make each of the plurality of pixels 241 output a signal, and causes the readout unit 22 to output a signal for the generation of a radiation image based on the signal output from each of the pixels 241. The power consumption in a period during which a digital signal for the generation of a radiation image is output may be equal to that in the power consumption mode M2 in the period T2. That is, the control unit 21 may cause the power supply unit 212 to supply the power P_Vg, P_AMP, P_SH, P_MPX, P_Buff, P_A_ADC, P_D_ADC, and P_D equal to those in the period T2 to the drive unit 23 and the readout unit 22. At this time, the radiation image generated based on the signals output from the readout unit 22 is displayed on, for example, the monitor of the control console 12. This allows the user to observe the obtained radiation image.

Figure 6:
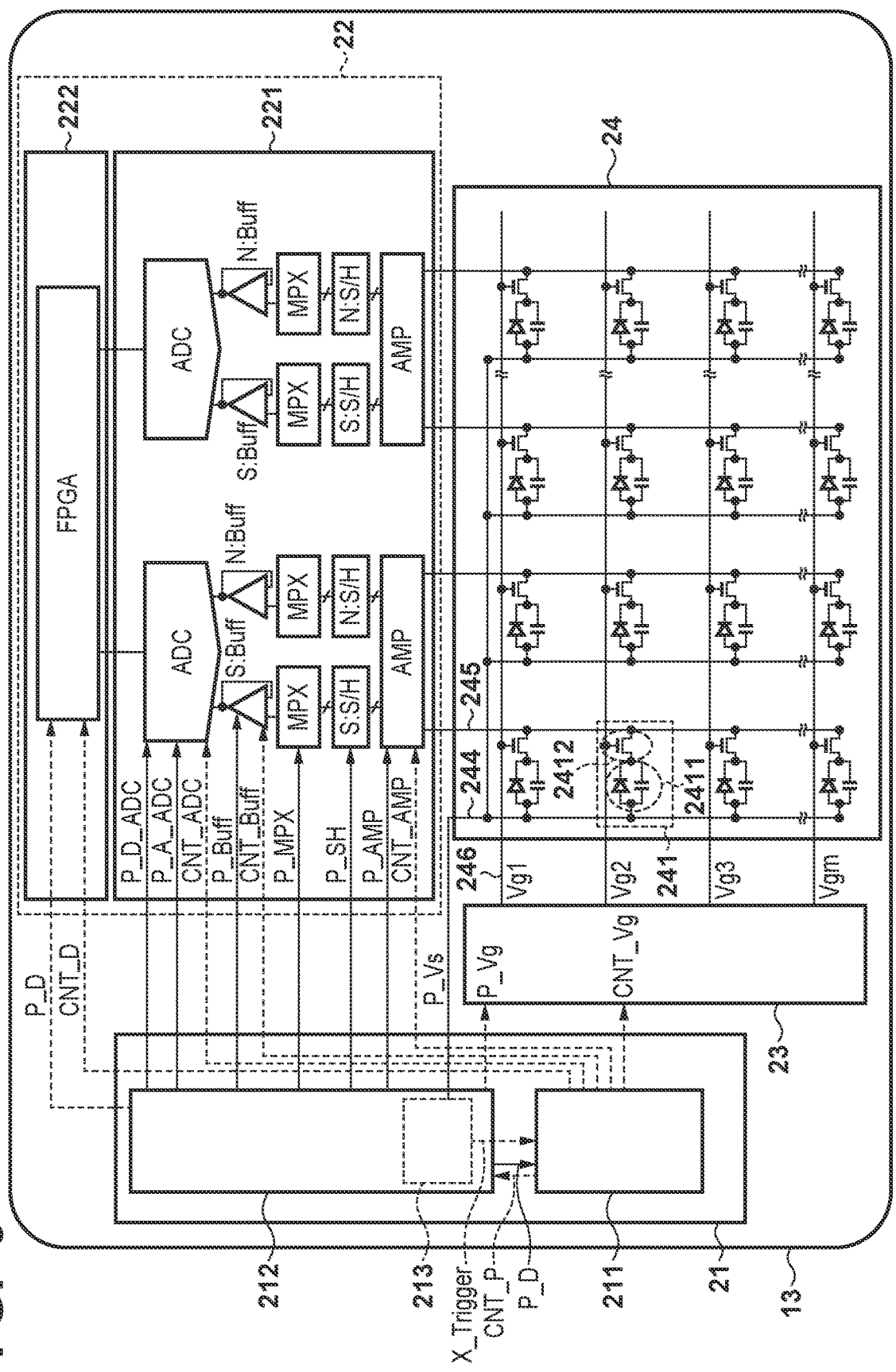
FIG. 6 is an equivalent circuit diagram showing a modification of the radiation imaging apparatus in FIG. 2.

The arrangement and operation of a radiation imaging apparatus 13 according to an embodiment of the present invention will be described with reference to FIGS. 6 to 8 and 11B. FIG. 6 is an equivalent circuit diagram showing the arrangement of the radiation imaging apparatus 13 according to the second embodiment of the present invention. As compared with the first embodiment, the radiation imaging apparatus 13 according to this embodiment has a current detection circuit 213 provided for a power supply unit 212 of a control unit 21, and hence can measure a current flowing in a bias line 244. Because other constituent elements may be the same as those of the first embodiment described above, a description of them will be omitted.

In the radiation imaging apparatus 13 according to this embodiment, as in the first embodiment, the power supply unit 212 supplies power P_Vs to each pixel 241 of an imaging unit 24 via the bias line 244. When the imaging unit 24 is irradiated with radiation, a conversion pixel 2411 of each pixel 241 accumulates electric charge by photoelectric conversion. On the first electrode side of the conversion pixel 2411, because there is a parasitic capacitance between a signal line 245 and a drive line 246, a current corresponding to the electric charge generated by photoelectric conversion flows in the signal line 245 and the bias line 244 via the parasitic capacitance while radiation irradiation is being performed. When a switch element 2412 of the conversion pixel 2411 in which electric charge is accumulated is rendered conductive, a current corresponding to the accumulated electric charge also flows in the signal line 245 and the bias line 244. In the embodiment, the current detection circuit 213 is provided for the power supply unit 212 of the control unit 21, and the control unit 21 determines, based on a current I_Vs flowing in the bias line 244, whether radiation irradiation is performed, thereby acquiring information about the start of radiation irradiation.

Figure 7:
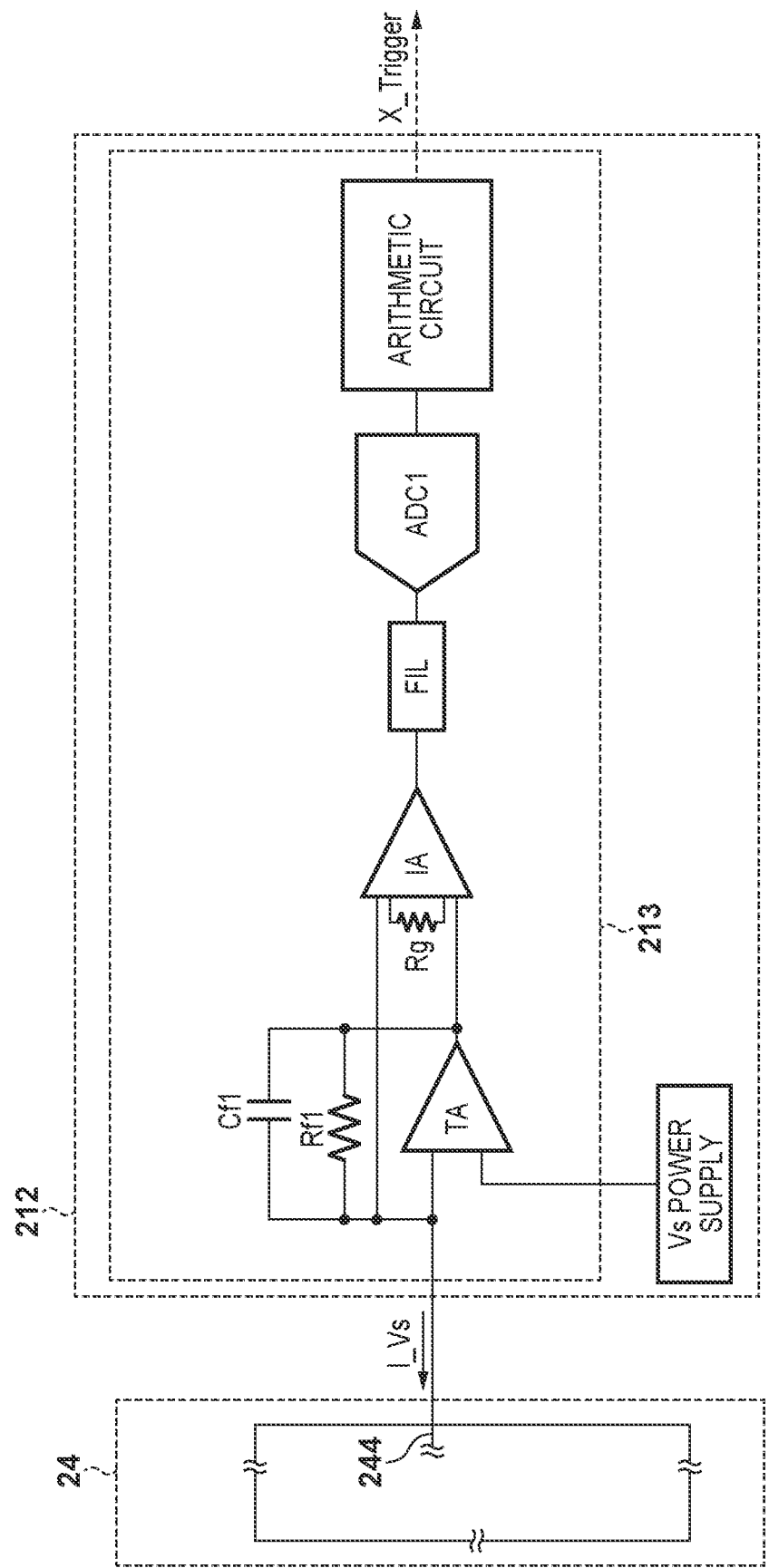
FIG. 7 is an equivalent circuit diagram showing an example of the arrangement of the current detection circuit of the radiation imaging apparatus in FIG. 6.

FIG. 7 is an equivalent circuit diagram showing an example of the arrangement of the current detection circuit 213. The current detection circuit 213 is provided for the power supply unit 212 of the control unit 21, and is configured to supply the power P_Vs to the bias line 244 and, at the same time, detect the current I_Vs. The current I_Vs flows in the imaging unit 24 via the bias line 244. The current detection circuit 213 converts the current I_Vs into voltage information by using a transimpedance amplifier TA, a feedback resistor Rf1, and a phase compensation capacitor Cf1 which are electrically connected to the bias line 244. An instrumentation amplifier IA on the subsequent stage includes a gain setting resistor Rg, and amplifies converted voltage information as needed. A filter FIL limits the amplified voltage output to a proper band. An analog/digital converter ADC1 then converts the voltage output into a digital signal with reduced noise. Upon determining, based on the digital signal converted by the analog/digital converter ADC1, that radiation irradiation has started, the arithmetic circuit transmits start information X-Trigger to a signal control unit 211 of the control unit 21. That is, the control unit 21 can acquire the start information X-Trigger based on the amount of current I_Vs flowing in the bias line 244. In accordance with the acquired start information X-Trigger, as in the first embodiment described above, the control unit 21 causes processing units including a drive unit 23 and a readout unit 22 to transit from a power consumption mode M1 before radiation irradiation to a power consumption mode M2 of performing exposure control upon radiation irradiation. In this embodiment, the current detection circuit 213 is provided for the power supply unit 212 of the control unit 21. However, this is not exhaustive, and the current detection circuit 213 may be configured independently of the power supply unit 212 or may further be configured independently of the control unit 21.

Figure 8:
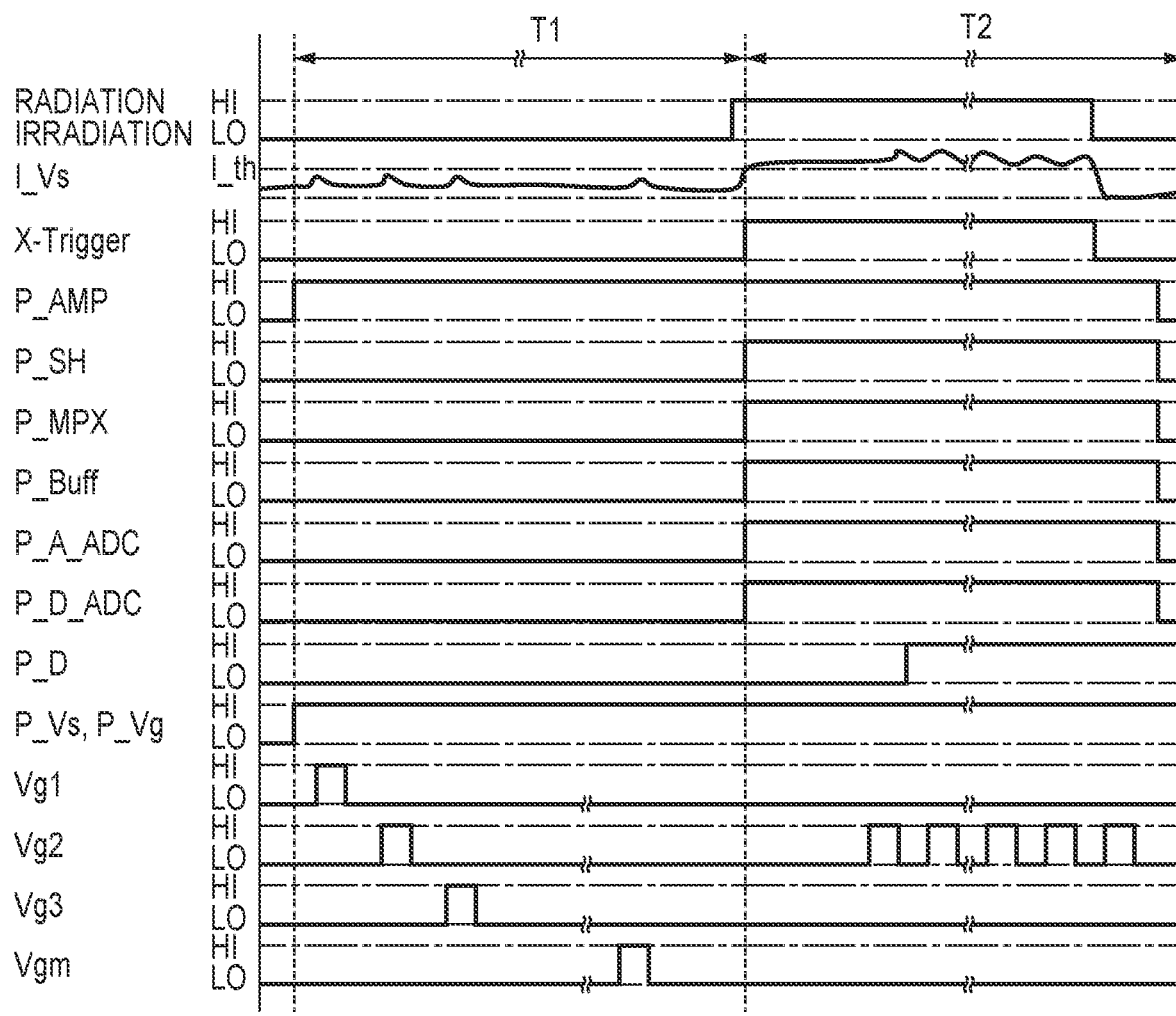
FIG. 8 is a timing chart for explaining an operation example of the radiation imaging apparatus in FIG. 6.

The operation of the radiation imaging apparatus 13 according to this embodiment will be described next with reference to the timing chart of FIG. 8. As in the first embodiment described above, a period T1 in the timing chart corresponds to an imaging preparation state before radiation irradiation. During this period, the user operates a control console 12 to perform setting of irradiation conditions such as the tube voltage and tube current of the radiation source included in a radiation irradiation unit 11, positioning of an object, and the like.

During the period T1, the control unit 21 performs control to apply a bias voltage Vs to the bias line 244 and drive voltages Vg1 to Vgm to the drive line 246. The power supply unit 212 respectively supplies power P_Vs and power P_Vg to the bias line 244 and the drive unit 23 under the control of the control unit 21. In order to periodically remove (reset) electric charge originating from a dark current in the conversion pixel 2411 of each pixel 241, an HI voltage is sequentially applied to the drive line 246 to which the drive voltages Vg1 to Vgm are supplied. The switch element 2412 connected to the drive line 246 to which the HI voltage is applied renders the conversion pixel 2411 conductive to the signal line 245, thereby resetting the conversion pixel 2411 of each pixel 241. At this time, a charge amplifier AMP has short-circuited a switch R_sw under the control of the control unit 21, and the conversion pixel 2411 of the pixel 241 rendered conductive to the signal line 245 is reset to the reference potential supplied to the charge amplifier AMP. In this embodiment, the current detection circuit 213 of the power supply unit 212 monitors a change in the amount of current I_Vs flowing in the bias line 244. In addition to causing the current detection circuit 213 to monitor the current I_Vs flowing in the bias line 244, the control unit 21 can cause the processing units including the drive unit 23 and the readout unit 22 to set the power consumption in the period T1 described with reference to FIG. 5A.

Upon detecting the current I_Vs exceeding a predetermined threshold Ith while monitoring the current I_Vs, the current detection circuit 213 determines that radiation enters, and sends start information X-Trigger indicating the start of radiation irradiation to the signal control unit 211. Upon acquiring the start information X-Trigger, the control unit 21 transits to a period T2. In accordance with the start information X-Trigger, the control unit 21 increases power P_SH, P_MPX, P_Buff, P_A_ADC, P_D_ADC, and P_D supplied from the power supply unit 212 by increasing a voltage to be supplied. With this operation, the readout unit 22 makes the signal output from the pixel 241, of the plurality of pixels 241 of the imaging unit 24, which functions as a detection unit ready to be converted into a digital signal.

In this embodiment, the control unit 21 causes the readout circuit 222 as an arithmetic unit to stop arithmetic processing for a predetermined time after the acquisition of the start information X-Trigger, thereby setting the readout circuit 222 in the standby state. This makes it possible to suppress power P_D until the readout circuit 222 is operated. During a period before the operation of the readout circuit 222, information about radiation entering the pixel 241 functioning as a detection unit is accumulated in the pixel 241 and hence is not lost. In addition, after the start of supply of the power P_SH, P_MPX, P_Buff, P_A_ADC, P_D_ADC, and P_D, the control unit 21 makes the drive unit 23 and the readout unit 22 stand by for a predetermined period. This can stabilize the power supplied to the processing units including the drive unit 23 and the readout unit 22 and the temperature of each constituent element included in the processing units, thereby improving the accuracy of the digital signal output from the readout unit 22. After the lapse of a predetermined time, the control unit 21 causes the processing units to operate so as to periodically read out a signal for exposure control from the pixel 241 functioning as a detection unit as in the first embodiment described above.

A change in the amount of current I_Vs in the current detection circuit 213 is only required to be monitored with an accuracy that allows the detection of radiation irradiation. This makes it possible for the readout unit 22 to monitor the start of radiation irradiation with a sufficiently small amount of power as compared with a case in which the signal output from the pixel 241 functioning as a detection unit is converted into a digital signal.

In this embodiment, the control unit 21 causes the processing units including the drive unit 23 and the readout unit 22 to transit to a power consumption mode M2 for exposure control in accordance with the start information X-Trigger, and makes the processing units stand by for a predetermined time. The control unit 21 then causes the processing units to output a signal for exposure control. That is, after the lapse of a predetermined time, the control unit 21 causes the drive unit 23 and the readout unit 22 to operate such that the drive unit 23 causes the pixel 241 functioning as a detection unit to start outputting a signal, and the readout unit 22 starts outputting a digital signal based on the signal output from the detection unit. This can stabilize the power supplied to the processing units and the temperature of each constituent element included in the processing units, thereby improving the accuracy of exposure control during the standby state. In this case, the user may set a time during which the control unit 21 makes the processing units stand by via the control console 12 after the transition of the power consumption mode in the period T1. Alternatively, such a time may be set at the time of shipment of the radiation imaging apparatus 13. This standby time may be longer than the time of one cycle in which the control unit 21 periodically reads out a signal from the pixel 241 functioning as a detection unit for exposure control.

FIG. 11B is a flowchart for briefly explaining this embodiment. While the radiation imaging apparatus 13 according to the embodiment is set in a standby state for imaging in the period T1 before radiation irradiation, the control unit 21 causes the processing units including the drive unit 23 and the readout unit 22 to operate in the power consumption mode M1. At this time, the control unit 21 causes the processing units to perform a reset operation for removing (resetting) a dark current from each of the plurality of pixels 241 of the imaging unit 24. In the power consumption mode M1, the current detection circuit 213 monitors the current I_Vs flowing in the bias line 244. When the amount of current I_Vs exceeds the preset threshold I_th, the current detection circuit 213 outputs the start information X-Trigger to the signal control unit 211 of the control unit 21. In accordance with the acquired start information X-Trigger, the control unit 21 causes the processing units to operate in the power consumption mode M2 with higher power consumption than the power consumption mode M1. At this time, the control unit 21 causes the processing units to stand by for a predetermined time after the power consumption mode M2 in the period T2. After the lapse of a predetermined time, the control unit 21 causes the processing units to start an operation for acquiring a signal for exposure control by using some of the pixels 241 in the imaging unit 24 as detection units. In this embodiment, the radiation imaging apparatus 13 that performs exposure control can suppress the amount of power consumed before radiation irradiation. In addition, this suppresses power consumption more than in the first embodiment described above by an amount corresponding to a standby operation for a predetermined time since the power consumption mode M2 in the period T2 during which exposure control is performed. In addition, because the power supplied to the processing units and the temperature of the processing units are stabilized during the standby state, the accuracy of the signal used for exposure control which is processed by the readout unit 22 and output from the readout unit 22 is improved, thereby improving the accuracy of exposure control.

Figure 9:
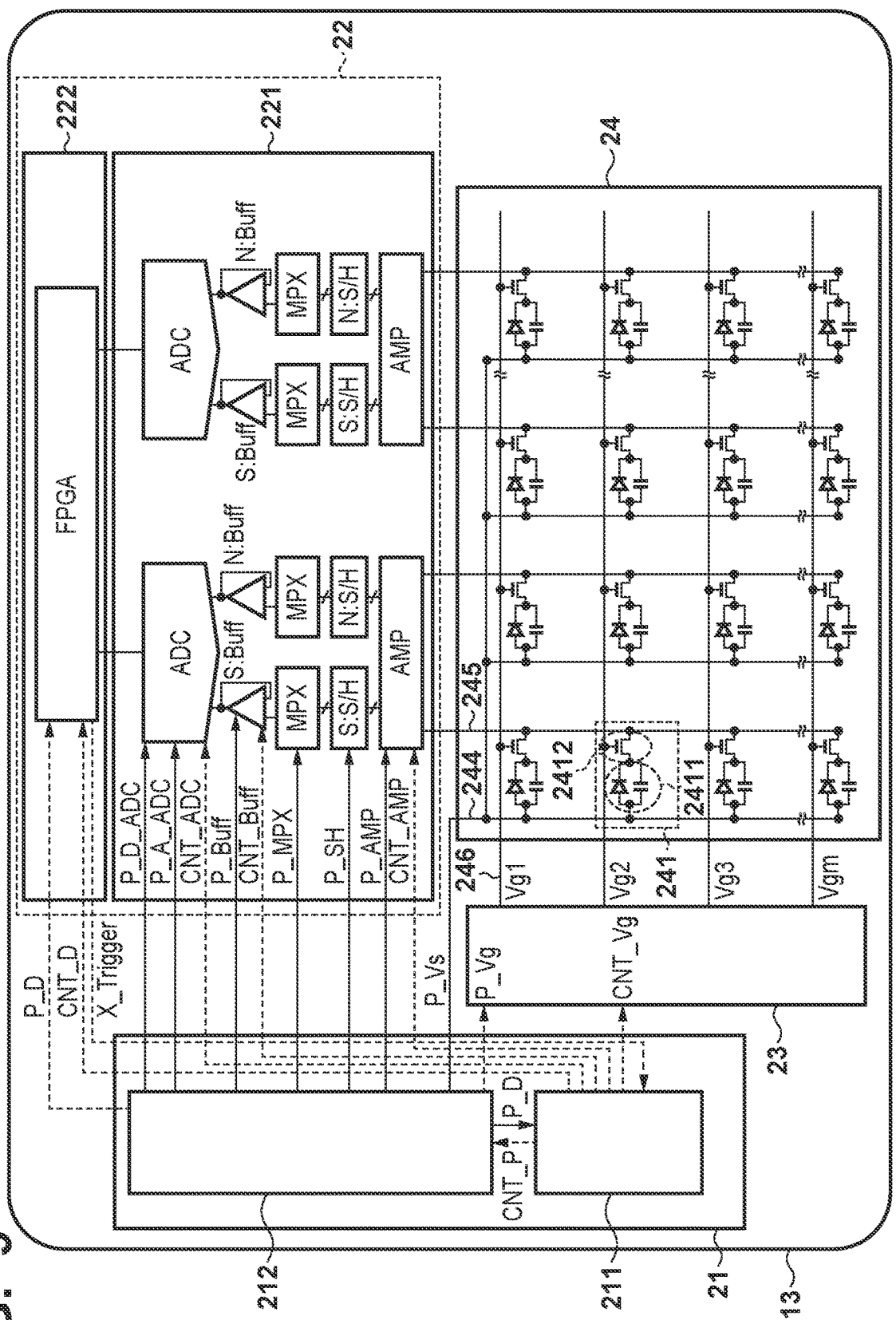
FIG. 9 is an equivalent circuit diagram showing a modification of the radiation imaging apparatus in FIG. 2.
Figure 10:
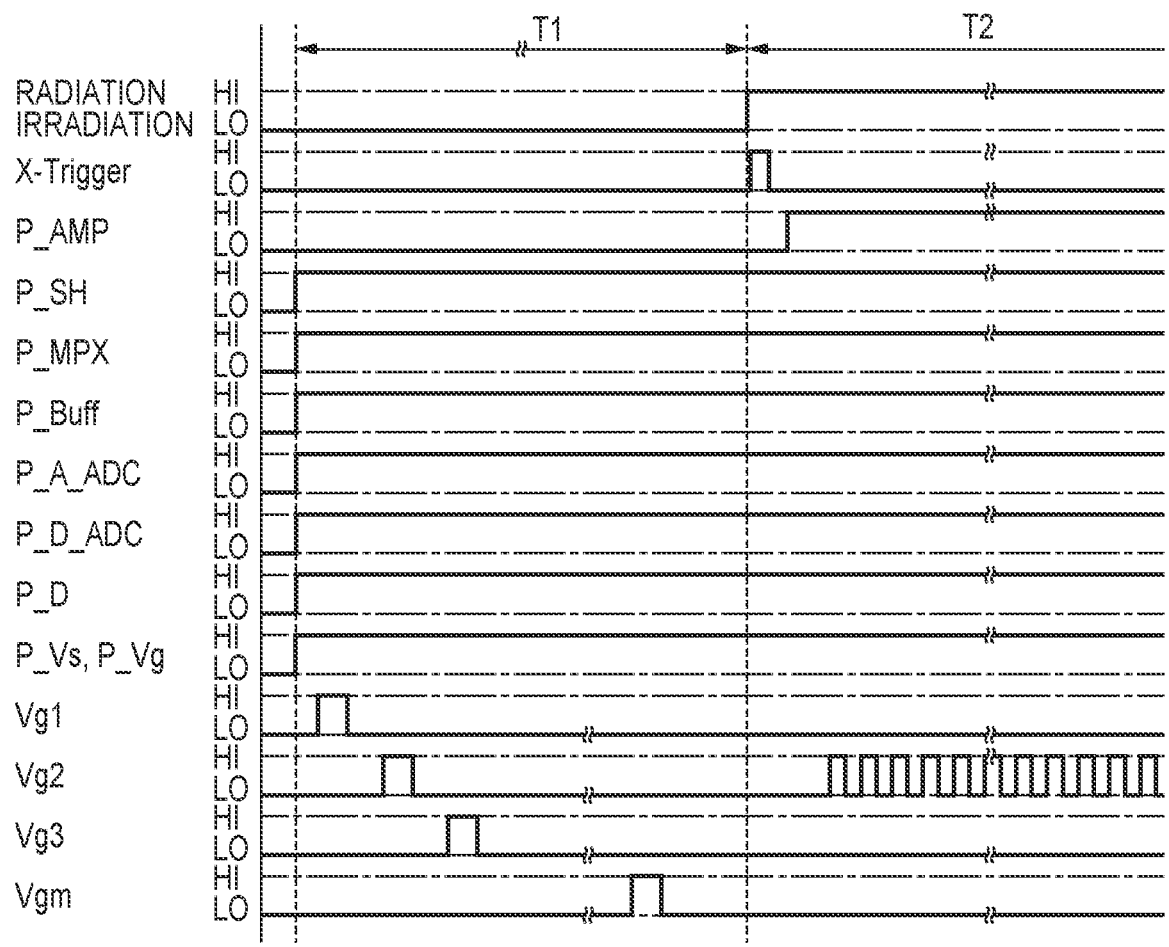
FIG. 10 is a timing chart for explaining an operation example of the radiation imaging apparatus in FIG. 9.

The arrangement and operation of a radiation imaging apparatus 13 according to an embodiment of the present invention will be described with reference to FIGS. 9, 10, and 11C. FIG. 9 is an equivalent circuit diagram showing the arrangement of the radiation imaging apparatus 13 according to the third embodiment of the present invention. In the radiation imaging apparatus 13 according to this embodiment, a control unit 21 is configured to acquire start information X-Trigger based on the signal output from a readout circuit 222. Because other constituent elements may be the same as those of the first embodiment described above, a description of them will be omitted.

The operation of the radiation imaging apparatus 13 according to this embodiment will be described next with reference to the timing chart of FIG. 10. As in the first embodiment, a period T1 in this timing chart corresponds to an imaging preparation state before radiation irradiation. During this period, the user operates a control console 12 to perform setting of irradiation conditions such as the tube voltage and tube current of the radiation source included in a radiation irradiation unit 11, positioning of an object, and the like.

In the period T1, the control unit 21 causes processing units including a drive unit 23 and a readout unit 22 to operate in a power consumption mode M1. More specifically, the control unit 21 performs control to apply a bias voltage Vs to a bias line 244 and drive voltages Vg1 to Vgm to drive lines 246. A power supply unit 212 respectively supplies power P_Vs and power P_Vg to the bias line 244 and the drive unit 23 under the control of the control unit 21. In order to periodically remove (reset) electric charge originating from a dark current in a conversion pixel 2411 of each pixel 241, an HI voltage is sequentially applied to the drive lines 246 to which the drive voltages Vg1 to Vgm are supplied. At this time, as in the first embodiment, a charge amplifier AMP short-circuits a switch R_sw, and the potential of the conversion pixel 2411 rendered conductive to a signal line 245 is reset to the reference potential supplied to the charge amplifier AMP. On the other hand, the control unit 21 performs control to suppress the current consumption of the charge amplifier AMP more than in the first embodiment by using the signal CNT_AMP. This increases the amount of noise in the charge amplifier AMP but reduces the power consumption in period T1. In addition, in this embodiment, the control unit 21 performs control to also supply power P_SH, P_MPX, P_Buff, P_A_ADC, P_D_ADC, and P_D in the power consumption mode M1 in the period T1 before radiation irradiation. With this operation, the control unit 21 causes the drive unit 23 and the readout unit 22 to operate such that the drive unit 23 causes a pixel 241 functioning as a detection unit to output a signal, and the readout unit 22 outputs a digital signal based on the signal output from the detection unit. In the period T1 before radiation irradiation, based on the digital signal converted from the signal continuously output from the detection unit, the readout circuit 222 determines the start of radiation irradiation.

Upon determining that radiation irradiation is detected, the readout circuit 222 outputs the start information X-Trigger to a signal control unit 211 of the control unit 21. Upon transiting to the period T2 in accordance with the acquisition of the start information X-Trigger, the control unit 21 causes the processing units including the drive unit 23 and the readout unit 22 to operate in a power consumption mode M2. In accordance with the start information X-Trigger, the control unit 21 increases power P_SH, P_MPX, P_Buff, P_A_ADC, P_D_ADC, and P_D supplied from the power supply unit 212 by increasing a voltage to be supplied. With this operation, the readout unit 22 makes the signal output from the pixel 241, of the plurality of pixels 241 of an imaging unit 24, which functions as a detection unit ready to be converted into a digital signal, thus performing exposure control. In addition, in a period T2, the control unit 21 increases the amount of current consumed by the charge amplifier AMP by using the signal CNT_AMP. This increases the power consumption but reduces the amount of noise generated in the charge amplifier AMP, thus improving the accuracy of exposure control. The cycle of outputting a digital signal from the detection unit and outputting a digital signal from the readout unit 22 in the period T2 is set higher than in the period T1. This can improve the time resolution when performing exposure control.

In this embodiment, the readout circuit 222 detects the incidence of radiation and outputs the start information X-Trigger to the control unit 21. However, this is not exhaustive. The control unit 21 may acquire the digital signal output from the readout circuit 222 in the period T1 and acquire the start information X-Trigger based on the integral value of the digital signal. Alternatively, a constituent element independent of the readout circuit 222 and the control unit 21 may detect the start of radiation irradiation from the digital signal output from the readout circuit 222 and transmit the start information X-Trigger to the control unit 21.

FIG. 11C is a flowchart for briefly explaining this embodiment. While the radiation imaging apparatus 13 according to the embodiment is in an imaging standby state in the period T1 before radiation irradiation, the control unit 21 controls the processing units including the drive unit 23 and the readout unit 22 in the power consumption mode M1. At this time, the control unit 21 causes the processing units to remove (reset) a dark current in each of the plurality of pixels 241 of the imaging unit 24. In the power consumption mode M1, the control unit 21 causes the readout unit 22 to convert the signal output from the pixel 241 functioning as a detection unit into a digital signal. The readout circuit 222 then monitors the converted digital signal. At this time, the cycle of outputting a signal from the detection unit may be longer than the cycle of outputting a signal from the detection unit for exposure control in the period T2. Upon determining that radiation enters, the readout circuit 222 causes the control unit 21 to output the start information X-Trigger to the signal control unit 211. In accordance with the start information X-Trigger, the control unit 21 causes the processing units to transit to the power consumption mode M2 in the period T2. Upon transiting to the power consumption mode M2 in the period T2, the control unit 21 causes the processing units to start an operation for acquiring a signal for exposure control by using some of the pixels 241 in the imaging unit 24 as detection units.

In the power consumption mode M1 in the period T1 before radiation irradiation, the control unit 21 causes the drive unit 23 and the readout unit 22 to operate such that the drive unit 23 causes a detection unit to output a signal, and the readout unit 22 outputs a digital signal based on the signal output from the detection unit. Upon transiting to the power consumption mode M2 in the period T2, the control unit 21 causes the processing units to output a signal for exposure control based on the signal read out from the pixel 241 functioning as a detection unit in a cycle shorter than the power consumption mode M1. With this operation, in this embodiment as well, the radiation imaging apparatus 13 that performs exposure control can suppress the amount of power consumed before radiation irradiation.

A radiation imaging system incorporating the radiation imaging apparatus 13 according to the present invention will be exemplarily described below with reference to FIG. 12. An X-ray 6060 generated by an X-ray tube 6050 as a radiation source for radiation irradiation passes through a chest 6062 of a patient or object 6061, and enters a radiation imaging apparatus 6040 (corresponding to the radiation imaging apparatus 13 described above). The incident X-ray contains internal information of the patient or object 6061. In the radiation imaging apparatus 6040, the scintillator emits light in correspondence with the incidence of the X-ray 6060, and the photoelectric elements photoelectrically convert the light, thereby obtaining electrical information. This information is digitally converted, undergoes image processing by an image processor 6070 serving as a signal processing unit, and can be observed on a display 6080 serving as a display unit in the control room.

This information can be transferred to a remote place by a transmission processing unit such as a network 6090, for example, a telephone, LAN, or Internet. This makes it possible to display the information on a display 6081 serving as a display unit in another place such as a doctor room, thus allowing a doctor in a remote place to make a diagnosis. In addition, the information can be recorded on a recording medium such as an optical disk. Furthermore, the information can also be recorded on a film 6110 serving as a recording medium by a film processor 6100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-119211, filed Jun. 22, 2018, which is hereby incorporated by reference herein in its entirety.

What is claimed is:

1. A radiation imaging apparatus, comprising:
an imaging unit including a plurality of pixels configured to generate a radiation image based on first signal corresponding to radiation;
a detection unit configured to detect the radiation entering the imaging unit;
a processing unit including an amplification unit configured to amplify the first signals output from the imaging unit and second signals output from the detection unit in a period during which the radiation enters, the processing unit being configured to perform processing of the first signals and the second signals, and outputting a signal based on the readout and amplified signals; and
a control unit configured to control the processing unit, wherein
the control unit causes the processing unit to operate in a first power consumption mode before radiation irradiation and perform a reset operation of resetting the plurality of pixels in the first power consumption mode, and
causes the processing unit to operate in a second power consumption mode with higher power consumption than in the first power consumption mode in accordance with start information indicating a start of irradiation of the imaging unit with radiation, and causes the processing unit to start outputting a signal indicating an incident dose of radiation entering the image unit based on the second signals in the second power consumption mode in the period.

2. The apparatus according to claim 1, wherein a voltage higher than a voltage in the first power consumption mode is supplied to at least part of the processing unit in the second power consumption mode.

3. The apparatus according to claim 1, wherein a larger amount of current is supplied to the processing unit in the second power consumption mode than in the first power consumption mode.

4. The apparatus according to claim 1, wherein the start information is input to the control unit from outside the radiation imaging apparatus.

5. The apparatus according to claim 1, further comprising a bias line configured to supply a bias voltage to each of the plurality of pixels, wherein
the control unit is configured to acquire the start information based on an amount of current flowing in the bias line, and cause the processing unit to transit from the first power consumption mode to the second power consumption mode in accordance with the acquired start information.

6. The apparatus according to claim 1, wherein the processing unit comprises a conversion unit configured to convert a signal output from the amplification unit into a digital signal and an arithmetic unit configured to arithmetically process a signal output from the conversion unit, and
an amount of current supplied in the second power consumption mode to at least one of the amplification unit, the conversion unit and the arithmetic unit is larger than that supplied in the first power consumption mode.

7. The apparatus according to claim 6, wherein the amplification unit is configured to supply a reference potential supplied to the amplification unit to a signal line connecting the imaging unit to the amplification unit,
the control unit is configured to reset the plurality of pixels by supplying the reference potential from the amplification unit to the plurality of pixels via the signal line in the reset operation, and
the control unit is configured to cause the amplification unit of the processing unit to operate in the first power consumption mode, and is configured to cause the conversion unit and the arithmetic unit of the processing unit to operate in the second power consumption mode.

8. The apparatus according to claim 1, wherein the control unit is configured to cause the processing unit to output a signal based on the second signals in the first power consumption mode, and
is configured to acquire the start information based on the signal and cause the processing unit to transit from the first power consumption mode to the second power consumption mode in accordance with the acquired start information.

9. The apparatus according to claim 8, wherein the control unit is configured to cause the processing unit to output a signal based on the second signals with a first cycle in the first power consumption mode, and
is configured to cause the processing unit to output a signal based on the second signals with a second cycle shorter than the first cycle in the second power consumption mode.

10. The apparatus according to claim 1, wherein the control unit is configured to cause the processing unit to transit to the second power consumption mode in accordance with start information and then after a predetermined standby time output a signal based on the second signals.

11. The apparatus according to claim 10, wherein the predetermined standby time is a time until at least one of power supplied to the processing unit and a temperature of the processing unit is stabilized.

12. The apparatus according to claim 1, wherein one of the plurality of pixels as the detection unit.

13. The apparatus according to claim 1, wherein the control unit causes the processing unit to operate in a third power consumption mode with higher power consumption than in the first power consumption mode after an end of irradiation of the imaging unit with radiation and output a signal for generating a radiation image based on the first signals.

14. A radiation imaging system comprising:
the radiation imaging apparatus according to claim 1; and
a radiation source configured to irradiate the radiation imaging apparatus with radiation, wherein
the radiation source is configured to be subjected to exposure control in accordance with a signal output from the processing unit to monitor an incident dose of radiation.

15. The apparatus according to claim 1, wherein the control unit is configured to determine whether a preset incident dose of radiation is achieved based on the signal indicating the incident dose of the radiation, and
the control unit is configured to output a signal for stopping radiation irradiation when it is determined that the preset incident dose of radiation is achieved.

16. The apparatus according to claim 1, further comprising signal lines, wherein the amplification unit is adapted to receive the first signals output from the imaging unit through the signal lines, and
the amplification unit is configured to receive the second signals output from the detection unit through the signal lines.

17. The apparatus according to claim 16, further comprising switching element arranged between the detection unit and corresponding signal line among the signal lines.

18. A control method for a radiation imaging apparatus including an imaging unit including a plurality of pixels configured to generate a radiation image based on first signals corresponding to radiation, a detection unit configured to detect the radiation entering the imaging unit, and a processing unit including an amplification unit configured to amplify the first signals output from the imaging unit and second signal output from the detection unit in a period during which the radiation enters, the processing unit being configured to perform processing of reading out signals from the imaging unit and the detection unit and outputting a signal based on the readout and amplified signals, the method comprising the steps of:

causing the processing unit to operate in a first power consumption mode and perform an operation of resetting the plurality of pixels before radiation irradiation; and causing the processing unit to operate in a second power consumption mode with higher power consumption than in the first power consumption mode in accordance with start information indicating a start of irradiation of the imaging unit with radiation, and causing the processing unit to start outputting a signal indicating an incident dose of radiation entering the image unit based on the second signals in the second power consumption mode in the period.

19. A non-transitory computer-readable storage medium storing a program for causing a computer to execute a control method for a radiation imaging apparatus including an imaging unit including a plurality of pixels configured to generate a radiation image based on first signals corresponding to radiation, a detection unit configured to detect the radiation entering the imaging unit, and a processing unit including an amplification unit configured to amplify the first signals output from the imaging unit and second signals output from the detection unit in a period during which the radiation enters, the processing unit being configured to perform processing of the first signals and the second signals and outputting a signal based on the readout and amplified signals, the method comprising the steps of:

causing the processing unit to operate in a first power consumption mode and perform an operation of resetting the plurality of pixels before radiation irradiation; and causing the processing unit to operate in a second power consumption mode with higher power consumption than in the first power consumption mode in accordance with start information indicating a start of irradiation of the imaging unit with radiation, and causing the processing unit to start outputting a signal indicating an incident dose of radiation entering the image unit based on the second signals in the second power consumption mode in the period.

* * * * *